United States Patent
Kuriya

(10) Patent No.: US 7,334,025 B2
(45) Date of Patent: Feb. 19, 2008

(54) COMMUNICATION SYSTEM USING COMMUNICATION NETWORK AND COMMUNICATION METHOD

(75) Inventor: Shinobu Kuriya, Chiba (JP)

(73) Assignee: Sony Corporation (JP)

( * ) Notice: Subject to any disclaimer, the term of this patent is extended or adjusted under 35 U.S.C. 154(b) by 1246 days.

(21) Appl. No.: 10/363,379

(22) PCT Filed: Jul. 2, 2002

(86) PCT No.: PCT/JP02/06700

§ 371 (c)(1),
(2), (4) Date: Feb. 27, 2003

(87) PCT Pub. No.: WO03/005263

PCT Pub. Date: Jan. 16, 2003

(65) Prior Publication Data
US 2003/0208532 A1    Nov. 6, 2003

(30) Foreign Application Priority Data
Jul. 5, 2001    (JP)    .............................. 2001-204575

(51) Int. Cl.
*G06F 13/00*    (2006.01)
(52) U.S. Cl. .................. 709/219; 709/224; 705/26; 713/193
(58) Field of Classification Search ............... 709/219, 709/224, 228; 713/169, 193; 705/26
See application file for complete search history.

(56) References Cited

U.S. PATENT DOCUMENTS

| | | | |
|---|---|---|---|
| 5,952,940 A | | 9/1999 | Matsumoto |
| 6,058,476 A | * | 5/2000 | Matsuzaki et al. .......... 713/169 |
| 6,163,772 A | * | 12/2000 | Kramer et al. ................ 705/79 |
| 6,230,269 B1 | * | 5/2001 | Spies et al. .................. 713/182 |
| 6,460,076 B1 | * | 10/2002 | Srinivasan ................... 709/219 |
| 7,124,094 B1 | * | 10/2006 | Kobayashi et al. ........... 705/26 |
| 2002/0099947 A1 | * | 7/2002 | Evans ........................ 713/193 |

FOREIGN PATENT DOCUMENTS

| | | |
|---|---|---|
| JP | 10-269289 A1 | 10/1998 |
| JP | 11-341044 A1 | 12/1999 |
| JP | 2001-155425 A1 | 6/2001 |
| WO | WO-93/08545 | 4/1993 |

* cited by examiner

*Primary Examiner*—Khanh Dinh
(74) *Attorney, Agent, or Firm*—Lerner, David, Littenberg, Krumholz & Mentlik, LLP

(57) ABSTRACT

A communication system for guaranteeing only one each of two processing operations, correlated with each other and executed on different devices. A server has a unit which, on receipt of a first processing request, with identification information, executes this processing only once for one item of the identification, and a unit for transmitting a first processing completion notice to the transmission source of the processing request on completion of the first processing or on re-receipt of the processing request for the first processing with the same identification of the completed first processing. The client has a server, a unit for transmitting the processing request for first processing with identification information, a unit for executing a second processing, previously correlated with the first processing, on receipt of the completion notice, and a unit for re-transmitting a processing request on detection of an error before receipt of a transmitted completion notice.

10 Claims, 23 Drawing Sheets

/-311

| CONTENT ID | CONTENT DATA | DECODING KEY | PRICE |
|---|---|---|---|
| CID#1 | CONTENT#1 | key#1 | ¥1000 |
| CID#2 | CONTENT#2 | key#2 | ¥1500 |
| ⋮ | ⋮ | ⋮ | ⋮ |

FIG.8

| USER ID | TEL NUMBER | USER NAME | ACCOUNT NUMBER | IP ADDRESS |
|---|---|---|---|---|
| user#1 | 090×××××××× | nameA | ○○BANK×× BRANCH OFFICE NORMAL ACCOUNT×××× | add#1 |
| user#2 | 090×××××××× | nameB | △△BANK□□ BRANCH OFFICE NORMAL ACCOUNT×××× | add#2 |
| ... | ... | ... | ... | ... |

| TID | PROCESSING REQUEST | UNPROCESSED BILLING FLAG |
|---|---|---|
| TID#1 | req#1 | 1 |
| TID#2 | req#2 | 0 |
| ⋮ | ⋮ | ⋮ |

| CONTENT ID | CONTENT DATA | DECODING KEY |
|---|---|---|
| CID#1 | CONTENT #1 | key#1 |
| ⋮ | ⋮ | ⋮ |

| TID | PROCESSING REQUEST |
|---|---|
| TID#1 | req#1 |
| TID#2 | req#2 |
| ⋮ | ⋮ |

FIG.15

COMMUNICATION SYSTEM USING COMMUNICATION NETWORK AND COMMUNICATION METHOD

CROSS-REFERENCE TO RELATED APPLICATIONS

This application is a U.S. national stage application of International Application No. PCT/JP02/06700, filed on Jul. 2, 2002, which has designated the U.S. and claims priority to Japan Patent Application No. 2001-204575 filed on Jul. 5, 2001.

BACKGROUND OF THE INVENTION

This invention relates to a communication system for information communication between computers, a server device, a client device, a portable telephone set, a communication method, a concerted processing providing method, a concerted processing method, a billing surrogating method, a content validating method, a program and a recording medium. More particularly, it relates to a communication system for performing concerted processing among plural devices, interconnected over a network, a server device, a client device, a portable telephone set, a communication method, a concerted processing providing method, a concerted processing method, a billing surrogating method, a content validating method, a program and a recording medium.

In keeping pace with the development of information processing apparatus, including computers, first of all, it has become possible to handle digital content, such as music or pictures, referred to below as content, by information processing apparatus, including computers. Moreover, in keeping pace with the development of information communication technology, services which permit variable content to be purchased over a communication network, using information processing apparatus, such as computers, are being offered in increasing numbers.

For example, if a user finds content he/she desires at a shop on the network (server device), he/she is able to download the encrypted content to a client device. At this time point, the content is still in an encrypted state, such that the content is not adequately reproducible, that is, the content is not validated.

The user transmits information necessary for payment of the cost to purchase the content to the server device. The server device then returns information for validating the content, for example, decoding key data, to the client device. Using the information thus sent from the server device, the client device is able to validate the content.

When validated, the content becomes usable in the client device. For example, if the content is music data, the music can be reproduced.

Meanwhile, in a system providing these services, content validation and payment of the cost to purchase must necessarily occur in synchronization with each other. That is, if the process of validating the content is performed, the process of payment of the cost to purchase must necessarily be performed. In a similar manner, when the process of payment of the cost to purchase is performed, the process of validating the content must necessarily be performed.

In data communication over a wide network, such as the Internet, there are occasions where transactions cannot be terminated due to, e.g., network malfunctions. For example, if malfunctions occur on the network as the ID (identification) and the password are being transmitted from the server device to the client device, there arises a situation in which, even though the user has made payment, the user cannot validate the content. If the user information necessary for payment is re-transmitted from the client to the server, the cost is collected in duplicate.

Thus, there is a need for a system which guarantees that, if a network malfunction has occurred, but one of the process of validating the content and the process of payment of the cost to purchase is completed, the other processing can necessarily be completed.

SUMMARY OF THE INVENTION

In view of the above-described status of the art, it is an object of the present invention to provide a communication system, a server device, a client device, a portable telephone set, a communication method, a concerted processing providing method, a concerted processing method, a billing surrogating method, a content validating method, a program and a recording medium, in which one each of two processing operations, which are correlated with each other and which are executed on different devices, is guaranteed.

For accomplishing the above object, the present invention provides a communication system for performing concerted processing among a plurality of devices interconnected over a network. The communication system includes a server device including first processing executing means which, on receipt of a processing request for a first processing, afforded with the identification information, executes the first processing once for one item of the identification information, and completion notice transmitting means which, on completion of the first processing by the first processing executing means, or on re-receipt of the processing request for the first processing, afforded with the same identification information as that of the completed first processing, transmits a completion notice of the first processing to the source of transmission of the processing request, and a client device including processing request transmission means for transmitting the processing request for the first processing, afforded with the identification information, to the server device, second processing executing means which, on receipt of the completion notice from the server device, executes second processing correlated in advance with the first processing, and re-transmitting means which, on detection of a communication error before receipt of the completion notice responsive to the processing request transmitted by the processing request transmission means, re-transmits the processing request to the server device.

In the communication system according to the present invention, the processing request transmitting means of the client device transmits a processing request for the first processing, afforded with the identification information, to the server device. If the processing request is a first one, the first processing is executed by the first processing executing means of the server device. On completion of the first processing, a completion notice is transmitted to the client device by the completion notice transmitting means. When the completion notice reaches the client device, the second processing is executed by the second processing executing means. If a communication error is detected before the completion notice reaches the client device, the processing request is re-transmitted by the re-transmitting means. Since the first processing has already been finished, the server device does not execute the first processing, but a completion notice is transmitted to the client device by the completion notice transmitting means.

The present invention also provides an alternative communication system for executing a sequence of processing operations for validating invalidated contents by a plurality of devices interconnected over a network. The communication system includes a server device, in turn including billing processing executing means which, on receipt of a processing request for billing processing for the cost of the contents, afforded with the identification information, executes the billing processing only once for one item of the identification information, and completion notice transmitting means which, on completion of the billing processing by the billing processing executing means, or on re-receipt of the processing request for the billing processing, afforded with the same identification information as that of the completed billing processing, transmits a completion notice of the billing processing to the source of transmission of the processing request, and a client device including processing request transmission means for transmitting the processing request for the billing processing for the contents, afforded with the identification information, to the server device, validation processing executing means which, on receipt of the completion notice from the server device, executes the processing of validating the invalidated contents, and re-transmitting means which, on detection of a communication error before receipt of the completion notice for the processing request transmitted by the processing request transmission means, re-transmits the processing request to the server device.

In this communication system, the processing request transmitting means of the client device transmits the processing request for the first processing, afforded with the identification information, to the server device. If the processing request is a first one, the processing of billing the cost of the contents is executed by the first processing executing means. When the billing processing is completed, a completion notice is transmitted to the client device by the completion notice transmitting means. When the completion notice reaches the client device, the processing of validating the contents is executed by the second processing executing means. If a communication error is detected before the completion notice reaches the client device, the processing request is re-transmitted by the re-transmitting means. Since the billing processing has already been completed in the server device, the billing processing is not executed, but the completion notice is transmitted to the client device by the completion notice transmitting means.

The present invention also provides a server device for performing concerted processing with another device interconnected over a network. The server device includes first processing executing means which, on receipt of a processing request for first processing, afforded with the identification information, executes the first processing only once for one item of the identification information, and completion notice transmitting means which, on completion of the first processing by the first processing executing means, or on re-receipt of the processing request for the first processing, afforded with the same identification information as that of the completed first processing, transmits a completion notice of the first processing to the source of transmission of the processing request.

This server device is used as a server device for the communication system according to the present invention.

The present invention also provides a server device for surrogating billing of the cost for payable contents. The server device includes billing processing executing means which, on receipt of a processing request for billing processing for the cost of the contents, afforded with the identification information, executes the billing processing only once for one item of the identification information, and completion notice transmitting means which, on completion of the billing processing by the billing processing executing means, or on re-receipt of the processing request for the billing processing, afforded with the same identification information as that of the completed billing processing, transmits a completion notice of the billing processing to the source of transmission of the processing request.

This server device is used as a server device for the alternative communication system according to the present invention described above.

The present invention also provides a client device for performing concerted processing with a server device connected thereto over a network. The client device includes processing request transmitting means for transmitting a processing request for first processing, afforded with the identification information, to the server device, second processing executing means which, on receipt of a completion notice of the first processing from the server device, executes second processing, correlated in advance with the first processing, and re-transmitting means which, if a communication error has been detected before receipt of a completion notice for the processing request transmitted by the processing request transmitting means, re-transmits the processing request to the server device.

This client device is used as a client device for the communication system according to the present invention.

The present invention provides a client device for validating invalidated contents by concerted processing with the processing by a server device. The client device includes processing request transmitting means for transmitting a processing request for billing processing, afforded with the identification information, to the server device, validation processing executing means which, on receipt of a completion notice of the billing processing from the server device, validates the invalidated contents, and re-transmitting means which, if a communication error has been detected before receipt of a completion notice for the processing request transmitted by the processing request transmitting means, re-transmits the processing request to the server device.

This client device is used as a client device for the alternative communication system of the present invention described above.

The present invention also provides a portable telephone set for validating invalidated contents by concerted processing with the processing by a server device. The portable telephone set includes processing request transmitting means for transmitting a processing request for billing processing, afforded with the identification information, to the server device, validation processing executing means which, on receipt of a completion notice of the billing processing from the server device, validates the invalidated contents, and re-transmitting means which, if a communication error has been detected before receipt of a completion notice for the processing request transmitted by the processing request transmitting means, re-transmits the processing request to the server device.

The portable telephone set is used as a client device of the communication system according to the present invention.

The present invention also provides a communication method for performing concerted processing between a server device and a client device interconnected over a network. The communication method includes a step of the client device transmitting a processing request for a first processing, afforded with the identification information, to the server device, a step of the server device executing the first processing only once for one item of the identification information, on receipt of the processing request, and of the server device transmitting a completion notice of the first processing to the client device, on completion of the first processing or on re-receipt of the processing request for the first processing, afforded with the same identification information as that of the completed first processing, and a step of the client device executing the second processing, correlated in advance with the first processing, on receipt of the completion notice from the server device, and of the client device re-transmitting the processing request to the server device on detection of a communication error before receipt of the completion notice.

With the communication method of the present invention, the processing similar to that executed in the communication system of the present invention is achieved.

The present invention also provides an alternative communication method for performing a sequence of processing operations for validating invalidated contents between a server device and a client device interconnected over a network. The alternative communication method includes a step of the client device transmitting a processing request for billing processing for the cost of the contents, afforded with the identification information, to the server device, a step of the server device executing the billing processing only once for one item of the identification information, on receipt of the processing request, and of the server device transmitting a completion notice of the billing processing to the client device, on completion of the billing processing or on re-receipt of the processing request for the billing processing afforded with the same identification information as that of the billing processing completed, and a step of the client device validating the invalidated contents, on receipt of the completion notice from the server device, and of the client device re-transmitting the processing request to the server device on detection of a communication error before receipt of the completion notice.

With this communication method, the processing similar to that executed on the alternative communication system of the present invention is achieved.

The present invention also provides a method for providing concerted processing in a server device, adapted for performing concerted processing with another device interconnected to the server device over a network. The concerted processing providing method includes the steps of executing first processing, on receipt of a processing request for the first processing, afforded with the identification information, only once for one item of the identification information, and transmitting a completion notice of the first processing to the source of transmission of the processing request, on completion of the first processing, or on re-receipt of the processing request for the first processing, afforded with the same identification information as that of the completed first processing.

With the present concerted processing providing method, the processing similar to that executed by the server device of the present invention is achieved.

The present invention provides a billing surrogating method in a server device for surrogating the billing of the cost of payable contents. The billing surrogating method includes the steps of executing the billing processing only once for one item of the identification information, on receipt of a processing request for billing processing for the cost of the contents, afforded with the identification information, and of transmitting a completion notice of the billing processing to the source of transmission of the processing request, on completion of the billing processing or on re-receipt of the processing request for the billing processing afforded with the same identification information as that of the completed billing processing.

With this billing surrogating method, the processing similar to that executed by the alternative server device of the present invention is achieved.

The present invention provides a concerted processing method in a client device executing concerted processing with processing by a server device connected to the client device over a network. The concerted processing method includes the steps of transmitting a processing request for the first processing, afforded with the identification information, to the server device, executing second processing, correlated in advance with the first processing, on receipt of a completion notice of the first processing from the server device, and re-transmitting the processing request to the server device if a communication error is detected before receipt of the completion notice.

With this concerted processing method, the processing similar to that executed by the client device of the present invention is achieved.

The present invention also provides a content validating method in a client device, adapted for performing the processing of validating invalidated contents, in a concerted operation with a server device. The content validating method includes the steps of transmitting a processing request for billing processing, afforded with the identification information, to the server device, validating the invalidated contents on receipt of a completion notice of the billing processing from the server device, and re-transmitting the processing request to the server device on detection of a communication error before receipt of the completion notice.

With this content validating method, the processing similar to that executed by the alternative client device of the present invention is achieved.

The present invention also provides a program for allowing to perform a concerted processing between a first computer and a second computer, interconnected over a network. The program is such a one in which the first computer transmits a processing request for a first processing, afforded with the identification information, to the second computer, the second computer on receipt of the processing request executing the first processing only once for one item of the identification information, the second computer transmitting a completion notice of the first processing to the first computer on completion of the first processing or on re-receipt of the processing request for the first processing afforded with the same identification information as that conferred to the completed first processing, and in which, on receipt of the completion notice from the second computer, the first computer executes the second processing correlated in advance with the first processing, the first computer re-transmitting the processing request to the second computer on detection of a communication error before receipt of the completion notice.

This program is read out and executed by the computer to realize the processing executed by the communication system according to the present invention.

The present invention also provides a program for a first computer and a second computer, interconnected over a network, to execute a sequence of processing operations for validating invalidated contents. The program is such a one in which the first computer transmits a processing request for billing processing for the cost of the contents, afforded with the identification information, to the second computer, the second computer on receipt of the processing request executes the billing processing only once for one item of the identification information, the second computer transmitting a completion notice of the billing processing to the first computer on completion of the billing processing or on re-receipt of the processing request for the billing processing afforded with the same identification information as that conferred to the completed billing processing, and in which, on receipt of the completion notice from the second computer, the first computer validates invalidated contents, the first computer re-transmitting the processing request to the second computer on detection of a communication error before receipt of the completion notice.

This program is read out and executed by the computer to realize the processing executed by the alternative communication system according to the present invention.

The present invention provides a program for allowing to perform concerted processing by a computer with another device connected thereto through a network. The program is such a one in which the computer on receipt of a processing request for a first processing, afforded with the identification information, executes the first processing only once for one item of the identification information, and in which the computer on completion of the first processing or on re-receipt of the processing request for the first processing, afforded with the same identification information as that conferred to the completed first processing, transmits a completion notice of the first processing to the source of transmission of the processing request.

This program is read out and executed by the computer to realize the processing executed by the server device according to the present invention.

The present invention provides a program for surrogating the billing of the cost of a payable content, by a computer. The program is such a one in which the computer on receipt of a processing request for billing processing for the cost of the contents, afforded with the identification information, executes the billing processing only once for one item of the identification information, and in which the computer on completion of the billing processing or on re-receipt of the processing request for the billing processing, afforded with the same identification information as that conferred to the completed billing processing, transmits a completion notice of the billing processing to the source of transmission of the processing request.

This program is read out and executed by a computer to realize the processing executed by the alternative server device according to the present invention.

The present invention also provides a program for allowing to perform concerted processing by a computer with a server device connected thereto over a network. The program is such a one in which the computer transmits to the server device a processing request for the first processing, afforded with the identification information, and in which, on receipt of a completion notice of the first processing from the server device, the computer executes second processing correlated in advance with the first processing, the computer re-transmitting the processing request to the server device if a communication error is detected before receipt of the completion notice.

This program is read out and executed by the computer to realize the processing executed by the client device according to the present invention.

The present invention also provides a program for allowing to perform the processing by a computer of validating invalidated contents in a concerted fashion with processing by a server device. The program is such a one in which the computer transmits a processing request for billing processing, afforded with the identification information, to the server device, and in which, on receipt of a completion notice of the billing processing from the server device, the computer executes the processing of validating the invalidated contents; the computer re-transmitting the processing request to the server device if a communication error is detected before receipt of the completion notice.

This program is read out and executed by the computer to realize the processing executed by the alternative client device according to the present invention.

The present invention also provides a computer-readable recording medium, having recorded thereon a program for allowing to perform concerted processing between a first computer and a second computer, interconnected over a network, the program being such a one in which the first computer transmits a processing request for a first processing, afforded with the identification information, to the second computer, the second computer on receipt of the processing request executes the first processing only once for one item of the identification information, the second computer transmitting a completion notice of the first processing to the first computer on completion of the first processing or on re-receipt of the processing request for the first processing afforded with the same identification information as that conferred to the completed first processing, the first computer on receipt of the completion notice from the second computer executing the second processing, correlated in advance with the first processing; the first computer re-transmitting the processing request to the second computer if a communication error is detected before receipt of the completion notice.

This program is read out and executed by the computer to realize the processing executed by a communication system according to the present invention.

The present invention also provides a computer-readable recording medium having recorded thereon a program for having a first computer and a second computer, interconnected over a network, execute a sequence of processing operations for validating invalidated contents, the first and second computers being interconnected over a network, the program being such a one in which the first computer transmits a processing request for a billing processing for the cost of the contents, afforded with the identification information, to the second computer, the second computer on receipt of the processing request executing the billing processing only once for one item of the identification information, the second computer transmitting a completion notice of the billing processing to the first computer on completion of the billing processing or on re-receipt of the processing request for the billing processing afforded with the same identification information as that conferred to the completed billing processing, the first computer on receipt of the completion notice from the second computer executing the processing of validating invalidated contents, the first computer re-transmitting the processing request to the second computer if a communication error is detected before receipt of the completion notice.

This program is read out and executed by a computer to realize the processing executed by another communication system according to the present invention.

The present invention provides a computer-readable recording medium having recorded thereon a program for allowing to perform concerted processing by a computer with another device interconnected thereto over a network. The program is such a one in which the computer on receipt of a processing request for a first processing, afforded with the identification information, executes the first processing only once for one item of the identification information, and in which the computer on completion of the first processing or on re-receipt of the processing request for the first processing, afforded with the same identification information as that conferred to the completed first processing, transmits a completion notice of the first processing to the source of transmission of the processing request.

This program is read out and executed by a computer to realize the processing executed by the server device according to the present invention.

The present invention provides a computer-readable recording medium having recorded thereon a program for surrogating the billing of the cost of a payable content by a computer, the program being such a one in which the computer on receipt of a processing request for billing processing for the cost of the payable content, afforded with the identification information, executes the billing processing only once for one item of the identification information, and in which the computer on completion of the billing processing or on re-receipt of the processing request for the billing processing, afforded with the same identification information as that conferred to the completed billing processing, transmits a completion notice of the billing processing to the source of transmission of the processing request.

This program is read out and executed by a computer to realize the processing executed by the alternative server device according to the present invention.

The present invention also provides a computer-readable recording medium, having recorded thereon a program for having a computer perform concerted processing with a server device connected to the computer over a network. The program is such a one in which the computer transmits a processing request for a first processing, afforded with the identification information, to the server device, and in which, on receipt of a completion notice of the first processing from the server device, the computer executes second processing correlated in advance with the first processing, the computer re-transmitting the processing request to the server device on the condition that a communication error is detected before receipt of the completion notice.

This program is read out and executed by the computer to realize the processing executed by a client device according to the present invention.

The present invention also provides a computer-readable recording medium, having recorded thereon a program for having a computer perform concerted processing of validating invalidated contents with a server device connected thereto over a network, the program being such a one in which the computer transmits a processing request for billing processing, afforded with the identification information, to the server device, and in which, on receipt of a completion notice of the billing processing from the server device, the computer executes the processing of validating invalidated contents, and the computer re-transmitting the processing request to the server device on the condition that a communication error is detected before receipt of the completion notice.

This program is read out and executed by a computer to realize the processing executed by the alternative client device according to the present invention.

Other objects, features and advantages of the present invention will become more apparent from reading the embodiments of the present invention as shown in the drawings.

BRIEF DESCRIPTION OF THE DRAWINGS

FIG. 8 shows an example of a data structure of a content information storage unit.

FIG. 10 shows an example of a data structure of a user information storage unit.

FIG. 12 shows an example of a data structure of a server side data storage unit.

FIG. 14 shows an example of a data structure of the content storage unit.

FIG. 15 shows an example of a data structure of a validation information storage unit.

DETAILED DESCRIPTION

Figure 1:
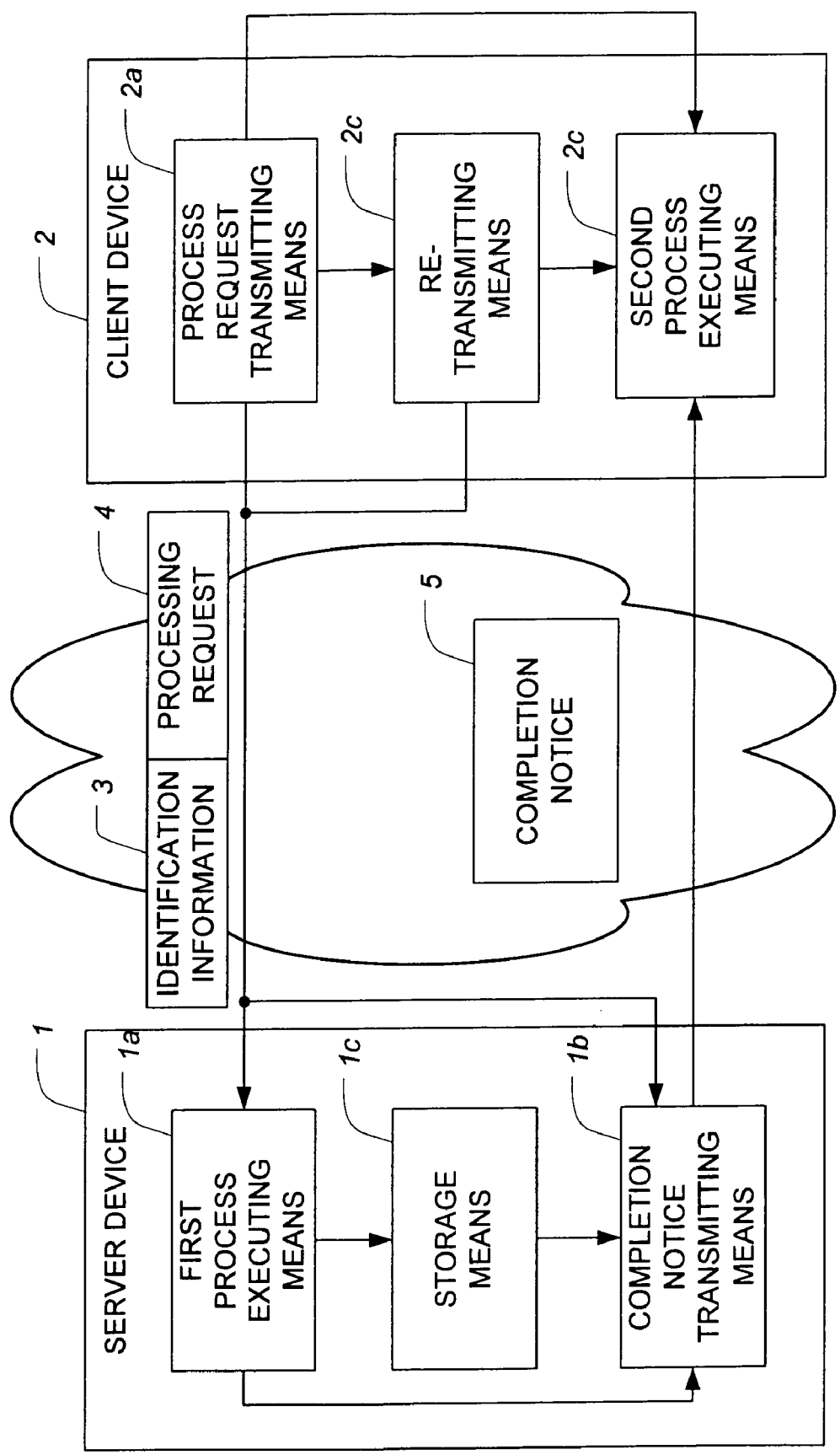
FIG. 1 is a schematic block diagram showing a communication system according to the present invention.

Referring to the drawings, certain preferred embodiments of the present invention will be explained in detail.

In a communication system according to the present invention, information processing is executed in a concerted fashion between a server device 1 and a client device 2, interconnected over a network 6.

The server device 1 includes first process executing means 1a, a completion notice transmitting means 1b and a storage means 1c. On receipt of a processing request 4 for the first process, having identification information 3 assigned thereto, the first process executing means 1a executes the first process only once for one identification information. Meanwhile, the first process executing means 1a verifies whether or not the first process for the identification information 3 was completed in the past depending on whether or not the received processing request 4 has been stored in the storage means 1c.

When the first process in the first process executing means 1a is finished, or when a process request 4 for the first processing, afforded with the same identification information 3 as that assigned to the completed first process, is re-received, the completion notice transmitting means 1b transmits a completion notice 5 of the first process to the client device 2. Meanwhile, the completion notice transmitting means 1b verifies whether or not the first process for the identification information 3 was completed in the past, depending on whether or not the received processing request 4 has been stored in the storage means 1c.

On completion of the first process in the first process executing means 1a, the storage means 1c stores the processing request 4 for the first process, having the identification information 3 assigned thereto, as process completion information.

The client device 2 includes a process request transmitting means 2a, a second process executing means 2b and a re-transmitting means 2c.

The processing request transmitting means 2a transmits the processing request 4 for the first process, having the identification information 3 assigned thereto, to the server device 1.

On receipt of the completion notice 5 of the first process from the server device 1, the second process executing means 2b executes the second process, correlated in advance with the first process. If a communication error has been detected before receipt of the completion notice 5 for the processing request 4 transmitted by the processing request transmitting means 2a, the re-transmitting means 2c re-transmits to the server device 1 the processing request 4 having the identification information 3 assigned thereto. It is when an error has been accepted by a lower network layer or a reply awaiting state has continued for longer than a predetermined time period that the communication error is detected.

Figure 2:
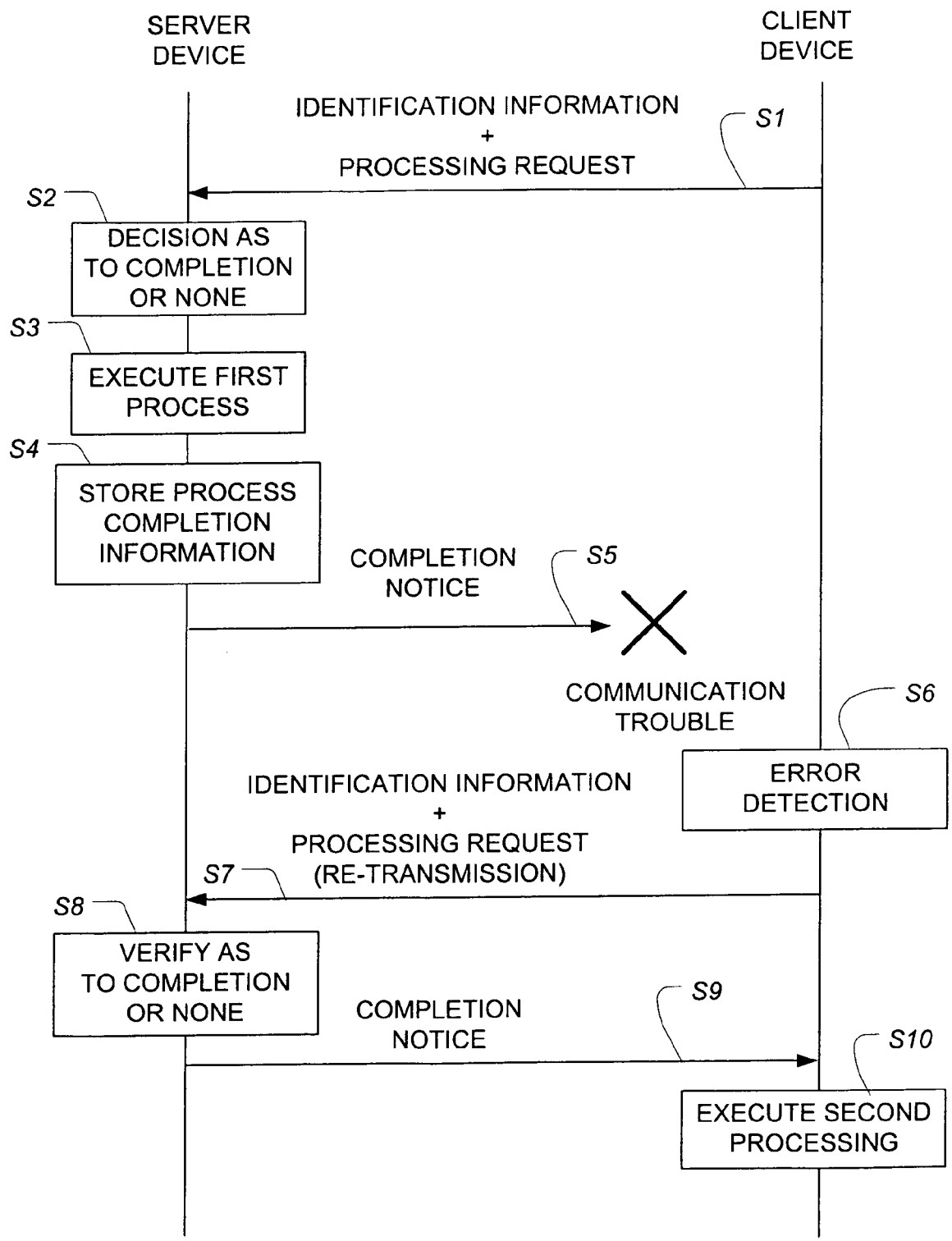
FIG. 2 is a sequence diagram showing an example of processing according to the present invention.

This above-described communication system executes the following process:

FIG. 2 is a sequence diagram showing a typical process in accordance with the present invention. The illustrative process, shown in FIG. 2, shows an embodiment in which transient communication malfunctions have occurred after execution of the first process by the server device 1.

First, the processing request transmitting means 2a of the client device 2 transmits a processing request 4 for the first process having the identification information 3 assigned thereto, to the server device 1 (step S1). The first process executing means 1a and the completion notice transmitting means 1b of the server device 1 then verify at step S2 whether or not the process complying with the processing request 4 for the first process, having the same identification information 3 assigned thereto, has already been completed (completion or non-completion). The completion or non-completion may be verified by whether or not the process completion information, comprised of a set of the identification information 3 and the processing request 4, has been stored in the storage means 1c. Since the processing request is the first processing request 4 at this time, no process completion information for the same content has been stored in the storage means 1c. Thus, it is verified that the relevant process has not been completed, and the first process is executed by the first process executing means 1a (step S3).

When the first process has been executed, the process completion information, comprised of the processing request 4 having the identification information 3 assigned thereto (set of the identification information 3 and the processing request 4) is stored in the storage means 1c (step S4). The completion notice transmitting means 1b transmits a completion notice 5 to the client device 2 (step S5).

In the present embodiment, the completion notice 5, transmitted at step S5, is not delivered to the client device 2 due to communication malfunction. Thus, an error is detected by the re-transmitting means 2c of the client device 2 (step S6). If an error is detected, the processing request 4, having the identification information 3 assigned thereto, is re-transmitted by the re-transmitting means 2c to the server device 1 (step S7).

On receipt of the processing request 4, having the identification information 3 assigned thereto, the server device 1 at step S8 references the stored contents of the storage means 1c, by the first process executing means 1a and the completion notice transmitting means 1b, to verify whether or not the processing responsive to the processing request 4, having the same identification information 3 assigned thereto, has already been completed (completion or non-completion). Since the process completion information for the same content has been stored at this time point in the storage means 1c, the processing responsive to the processing request 4, having the identification information 3 assigned thereto, is deemed to have come to a close. If the processing is deemed to have come to a close, the completion notice 5 is transmitted to the client device 2 by the completion notice transmitting means 1b (step S9).

On receipt of the completion notice 5, the second process executing means 2b of the client device 2 executes a second process relevant to the first process (step S10).

Thus, if communication has been interrupted due to a network malfunction, execution of one first process and one second process is guaranteed. If this processing is applied to content validation, execution of one billing process of the content cost by the server device 1 and one process of content validation by the client device 2 is guaranteed. This prevents unforeseen disadvantages otherwise incurred to the content provider or to the user who purchased the content. That is, there is no risk of the content not being validated despite payment of the cost or of the content being validated without cost payment. Additionally, application to the locker service or grouping service of the content is possible.

Meanwhile, the identification information 3 added to the processing request 4 is unique information in the server device 1. Thus, in the following embodiment, a transaction ID (TID) may be issued as the identification information 3 from the server device 1 to the client device 2.

It is also possible for the client device 2 to store the TID and the processing request 4, transmitted to the server device 1, and to erase the stored TID and processing request 4 on termination of the second process. This prohibits the TID from being used illicitly for other objects after a transaction has regularly come to a close, that is, after the termination of the first process and the second process. Additionally, the storage area of the client device 2 is used effectively.

As the client device 2, terminal devices, such as personal computers, portable information terminal devices or mobile communication devices, such as portable telephone sets, may be used.

In the following, certain preferred embodiments of the present invention, in which the present invention is applied to the sale of content, such as music data, over the Internet, are explained.

FIRST EMBODIMENT

A first embodiment of the present invention is now explained.

Figure 3:
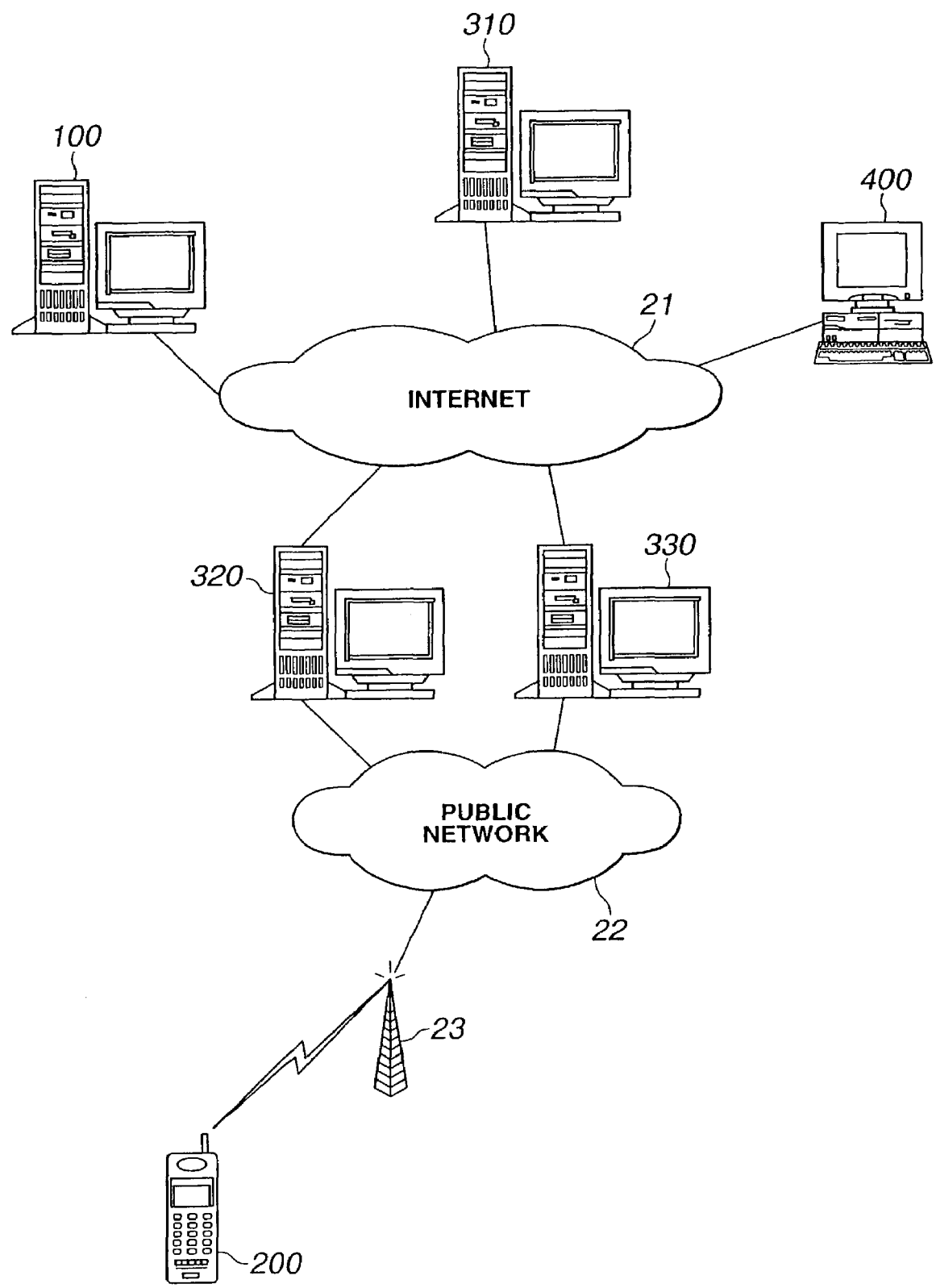
FIG. 3 shows an illustrative structure of a network system according to the present invention.

The network system embodying the present invention is configured as shown in FIG. 3. In the network system, shown in FIG. 3, an application server 100, a content server 310, a billing server 320, an accessing server 330 and a terminal device 400 are connected to the Internet 21. To a public network 22, a portable telephone set 200, the billing server 320 and the accessing server 330 are connected over a base station 23.

The base station 23 transmits/receives speech or data, over a radio route, with the portable telephone set 200 and with other portable telephone sets within a preset area, not shown.

The application server 100 performs the process of validating payable content provided from the content server 310 to the general public, such as music data, picture data or application programs for computers, in cooperation with portable telephone sets 200 or terminal devices 400.

The portable telephone set 200 is able to communicate with other portable telephone sets, not shown, via the base station 23. The portable telephone set 200 is able to access various servers on the Internet 21, such as application server 100 or content server 310, to perform concerted processing, browse the information or download content.

The content server 310 has stored therein payable content provided to users of the terminal device 400 or the portable telephone set 200. The content server 310 is responsive to requests from the terminal device 400 or the portable telephone set 200 to transmit content to the terminal device 400 or the portable telephone set 200.

The billing server 320 supervises the information, such as call time duration of the portable telephone set 200, and performs the process of collecting fees, such as charges for a call for the portable telephone set 200. The billing server 320 is responsive to the request from the application server 100 to collect the fee for the content downloaded to the portable telephone set 200.

The accessing server 330 performs the process of connecting the portable telephone set 200 as being a device on the Internet 21. For example, the accessing server 330 performs the process of allocating IP (Internet Protocol) addresses to the portable telephone set 200.

The terminal device 400 accesses various servers, such as the application server 100 or the content server 310, over the Internet 21, to perform concerted processing, browse the information or download content.

In the above-described network system, the content supervised by the content server 310 may be downloaded to the portable telephone set 200 or to the terminal device 400 to validate the content.

Figure 4:
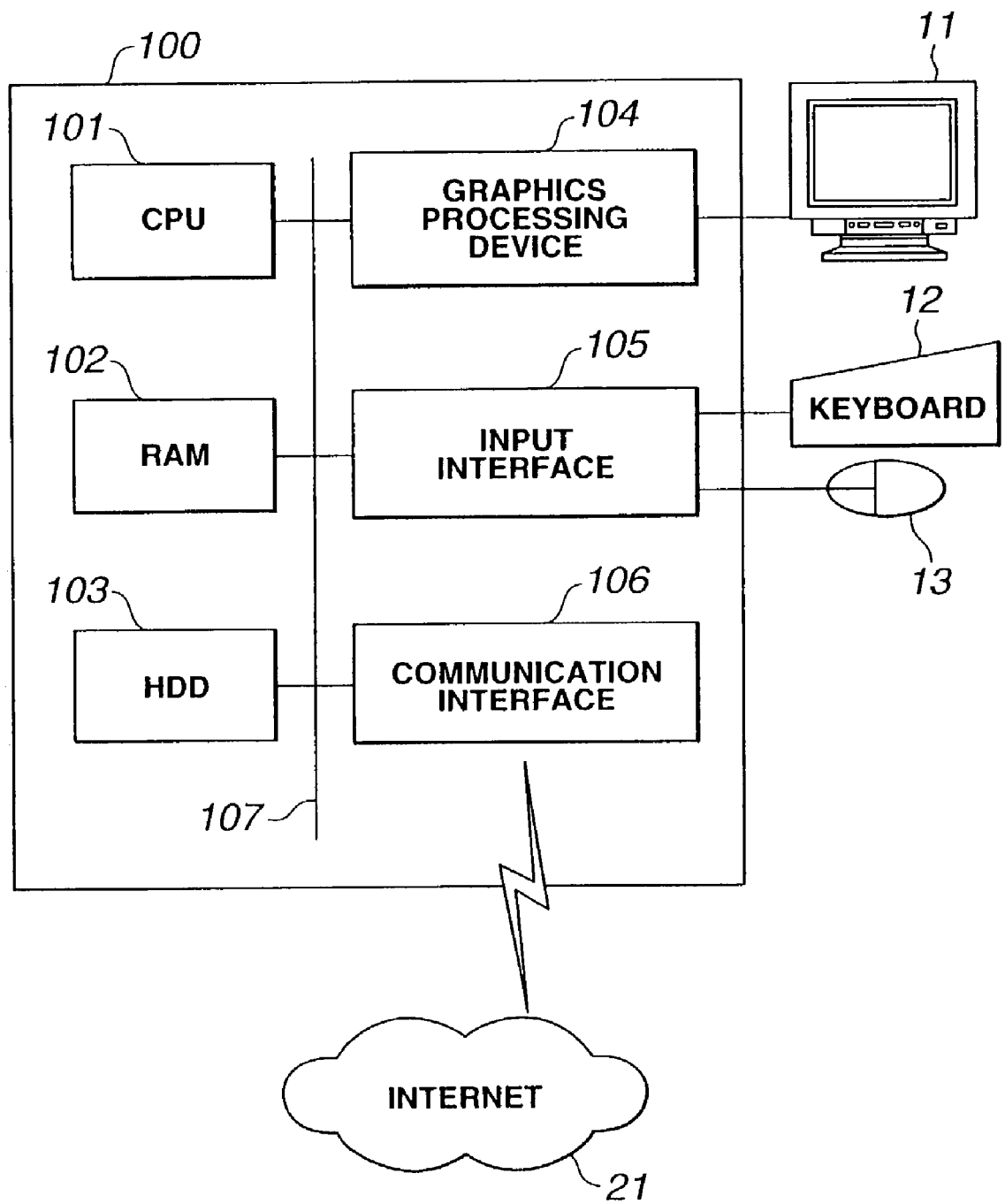
FIG. 4 is a block diagram showing an illustrative structure of the hardware of an application server.
Figure 5:
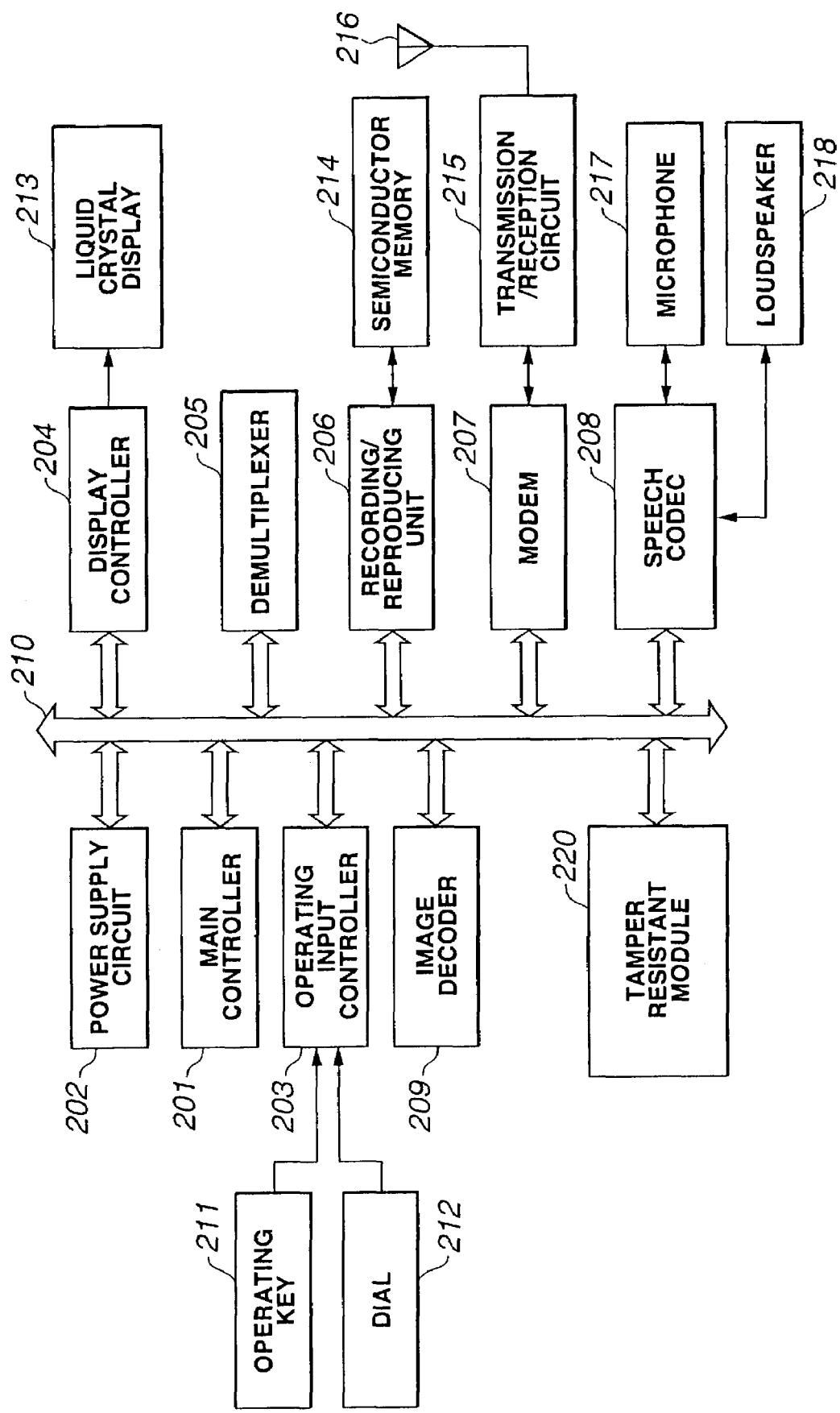
FIG. 5 is a block diagram showing an illustrative structure of the hardware of a portable telephone set.
Figure 6:
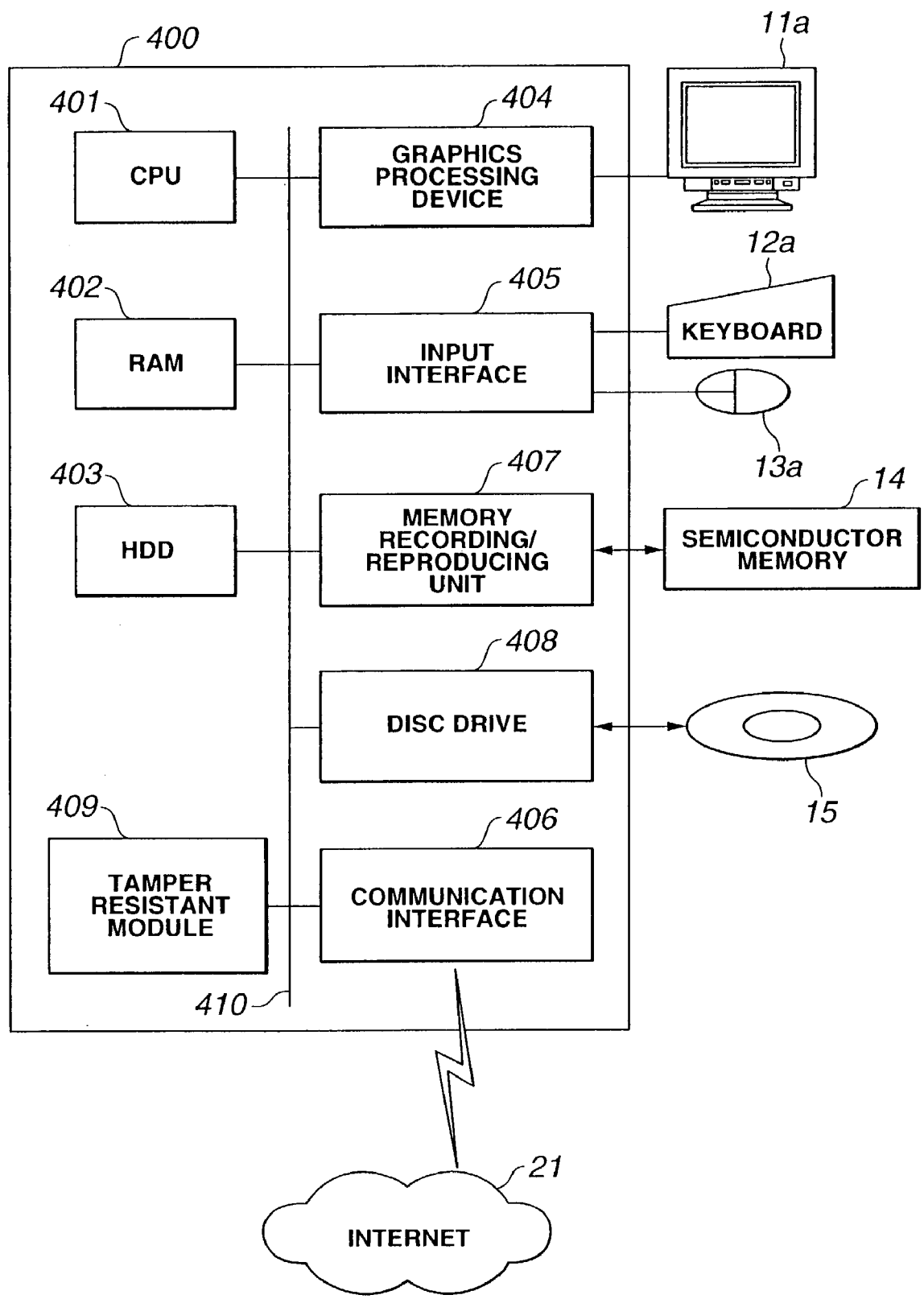
FIG. 6 is a block diagram showing an illustrative structure of the hardware of a terminal device.

Referring to FIGS. 4 to 6, the hardware structure of the various devices is explained.

FIG. 4 is a block diagram showing an illustrative hardware structure of the application server. The application server 100 in its entirety is controlled by a CPU (Central Processing Unit) 101. A RAM (Random Access Memory) 102, an HDD (Hard Disc Drive) 103, a graphics processing device 104, an input interface 105 and a communication interface 106 are connected to the CPU 101 through a bus 107.

At least a portion of the OS (Operating System) program or a portion of the application program run by the CPU 101 is transiently stored in the RAM 102. The RAM 102 also stores various data necessary for processing by the CPU 101. In the HDD 103 is stored the OS or the application program.

A monitor 11 is connected to the graphics processing device 104. The graphics processing device 104 causes a picture to be displayed on a screen of the monitor 11 under instructions from the CPU 101.

To the input interface 105 are connected a keyboard 12 and a mouse 13. The input interface 105 transmits signals sent from the keyboard 12 or the mouse 13 over bus 107 to the CPU 101.

The communication interface 106 is connected to the Internet 21. The communication interface 106 transmits/receives data with other computers over the Internet 21.

The processing functions of the present embodiment may be implemented by the above-described hardware structure.

Although the hardware structure of the application server 100 has been described and shown in FIG. 4, the content server 310, billing server 320 and the accessing server 330 may be implemented by a structure similar to the hardware structure shown in FIG. 4.

FIG. 5 is a block diagram showing an illustrative structure of the hardware of a portable telephone set. A portable telephone set 200 includes a main controller 201 controlling the overall functions of the portable telephone set 200. A power supply circuit 202, an operating input controller 203, a display controller 204, a demultiplexer 205, a recording and/or reproducing unit 206, a modem 207, a speech codec 208, an image decoder 209 and a tamper resistant module 220 are connected to the main controller 201 through a bus 210.

The main controller 201 includes a CPU, RAM, etc., mounted thereon, and operates itself as a computer.

When an operating input for power up is entered by a user, the power supply circuit 202 sends the power from a battery pack, not shown, to respective circuits. By the power being supplied from the battery pack to the respective circuits of the portable telephone set 200, the functions of the various elements shown in FIG. 5 may be achieved.

To the operating input controller 203 are connected an operating key 211 and a dial 212. The operating input controller 203 transmits the operating contents of the operating key 211 and the dial 212 over bus 210 to the main controller 201.

To the display controller 204 is connected a liquid crystal display 213. This display controller 204 generates a display picture in accordance with information or commands sent from the main controller 201 to display the generated display picture on the display 213.

On receipt of speech data and picture data, the demultiplexer 205 demultiplexes data received in accordance with a preset system and sends the resulting data to the modem 207. When supplied with multiplexed data from the modem 207, the demultiplexer 205 separates the multiplexed data. For example, the demultiplexer 205 separates the multiplexed data into coded picture data and into speech data. The demultiplexer 205 delivers the separated picture data to the recording and/or reproducing unit 206 or to the image decoder 209. The demultiplexer 205 also delivers the separated speech data to the speech codec 208.

To the recording and/or reproducing unit 206 can be connected a semiconductor memory 214. The recording and/or reproducing unit 206 records data on the semiconductor memory 214 or reads out data recorded on the semiconductor memory 214 under instructions from the main controller 201.

To the modem 207 is connected a transmission/reception circuit 215. The modem 207 performs spread spectrum processing on the multiplexed data sent from the demultiplexer 205 and sends the processed data to the transmission/reception circuit 215. On receipt of reception signals from the transmission/reception circuit 215, the modem 207 performs spread spectrum processing on the received signals and sends the processed signals to the demultiplexer 205.

An antenna 216 is connected to the transmission/reception circuit 215. The transmission/reception circuit 215 transmits the signals, sent thereto from the modem 207, over antenna 216 to the base station 23. The transmission/reception circuit 215 receives signals transmitted from the base station 23 over antenna 216 and sends the received signals to the modem 207.

To the speech codec 208 are connected a microphone 217 and a loudspeaker 218. On receipt of speech data from the demultiplexer 205, the speech codec 208 converts the speech data into analog signals which are supplied to the loudspeaker 218. When supplied with analog speech signals from the microphone 217, the speech codec 208 converts the speech signals into digital speech data which is then delivered to the demultiplexer 205.

On receipt of encoded picture data, the image decoder 209 decodes the picture data in accordance with a decoding system associated with the preset encoding system. The image decoder 209 sends the decoded picture data to the display controller 204.

The tamper resistant module 220 has an illicitness combating function. The illicitness combating function may, for example, be the function of erasing inner data in case an attempt is made to illicitly read out data in the tamper resistant module 220.

The tamper resistant module 220 uniquely has the function of a computer, such as a CPU or a RAM, and executes various data processing operations in accordance with commands from the main controller 201. For example, the tamper resistant module 220 stores data to be concealed from the user of the portable telephone set 200 (such as transaction ID: TID) in its inner RAM. The tamper resistant module 220 also proceeds to validate content stored in the semiconductor memory 214. By the tamper resistant module 220 performing the validating process, the algorithm for the content validating process may be kept in a state concealed from the user of the portable telephone set 200.

FIG. 6 is a block diagram showing an illustrative structure of the hardware of a terminal device. The terminal device 400 is controlled in its entirety by a CPU 401. To this CPU 401 are connected, over bus 410, a RAM 402, a hard disc drive (HDD) 403, a graphics processing device 404, an input interface 405, a communication interface 406, a memory recording and/or reproducing unit 407, a disc drive 408 and a tamper resistant module 409.

A monitor 11a is connected to the graphics processing device 404. A keyboard 12a and a mouse 13a are connected to the input interface 405.

Since the functions of the RAM 402, hard disc drive (HDD) 403, graphics processing device 404, input interface 405, communication interface 406, monitor 11a, keyboard 12a and mouse 13a are the same as those of the components of the application server 100 shown in FIG. 4, bearing the same appellations, these components are not explained here specifically.

A semiconductor memory 14 may be connected to the memory recording and/or reproducing unit 407. The memory recording and/or reproducing unit 407 is able to write data in the semiconductor memory 14 or read out data recorded thereon in accordance with commands from the CPU 401.

The disc drive 408, on or from which an optical disc 15 can be mounted or dismounted, is able to record data on the optical disc 15 or read out data recorded thereon in accordance with commands from the CPU 401. The optical disc 15 may, for example, be a DVD (Digital Versatile Disc), a DVD-RAM (Digital Versatile Disc-Random Access Memory), a CD-ROM (Compact Disc Read Only Memory) or a CD-R (Compact Disc-Recordable)/RW (Rewritable).

The tamper resistant module 409 uniquely has the function of a computer, such as a CPU or a RAM, and executes various data processing operations in accordance with commands from the CPU 401. For example, the tamper resistant module 409 stores data to be concealed from the user of the terminal device 400 (such as transaction ID: TID) in its inner RAM. The tamper resistant module 409 also proceeds to validate content. By the tamper resistant module 409 performing the validating process, the algorithm for the content validating process may be kept in a state concealed from the user of the terminal device 400. The tamper resistant module 409 may also be implemented as software on the RAM 402 or on the HDD 403.

Referring to FIGS. 7 to 15, the processing functions and the data structure in the content server 310, billing server 320, application server 100 and portable telephone set 200, as required for realizing the present embodiment, are explained.

Figure 7:
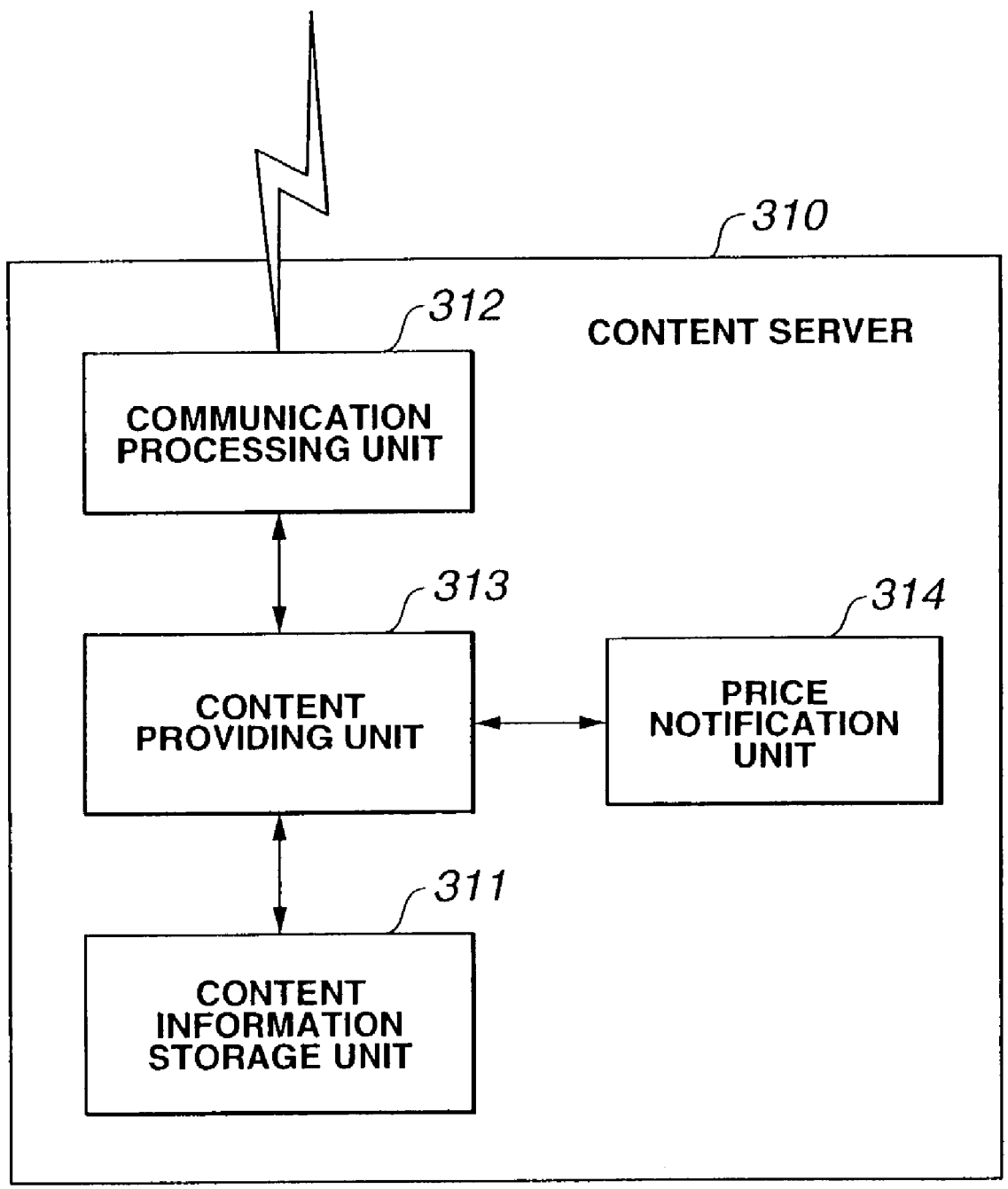
FIG. 7 is a functional block diagram showing an example of a processing function of a content server.

FIG. 7 is a functional block diagram showing an example of the processing functions of the content server. The content server 310 includes a content information storage unit 311, a communication processing unit 312, a content providing unit 313 and a price notification unit 314.

The content information storage unit 311 has stored therein the payable content supplied over the Internet 21, the identification information for the content (content ID), etc. The data structure of the content information storage unit 311 will be explained subsequently.

The communication processing unit 312 exchanges data with other devices over the Internet 21.

The content providing unit 313 is responsive to a request from the portable telephone set 200 or the terminal device 400 to transmit data, such as content or content decoding keys thereof.

The price notification unit 314 is responsive to a request from the application server 100 to notify the price of the content.

FIG. 8 shows an example of a data structure of the content information storage unit. In the example of FIG. 8, the content information storage unit 311 has columns for content ID, content data, decoding keys and price. The information for each item lying in the same row (the horizontally arrayed information in the drawing) are correlated with each other.

In the item of the content ID, there are registered unique identifiers (content IDs) by which the content stored in the content server 310 can be identified.

In the item of the content data are registered the contents. The contents registered in the item of the content data are encrypted.

In the item of the decoding keys, there are registered decoding keys for the contents registered in the item of the content data.

In the item of the price, there are registered the prices of the contents registered in the item of the content data.

Figure 9:
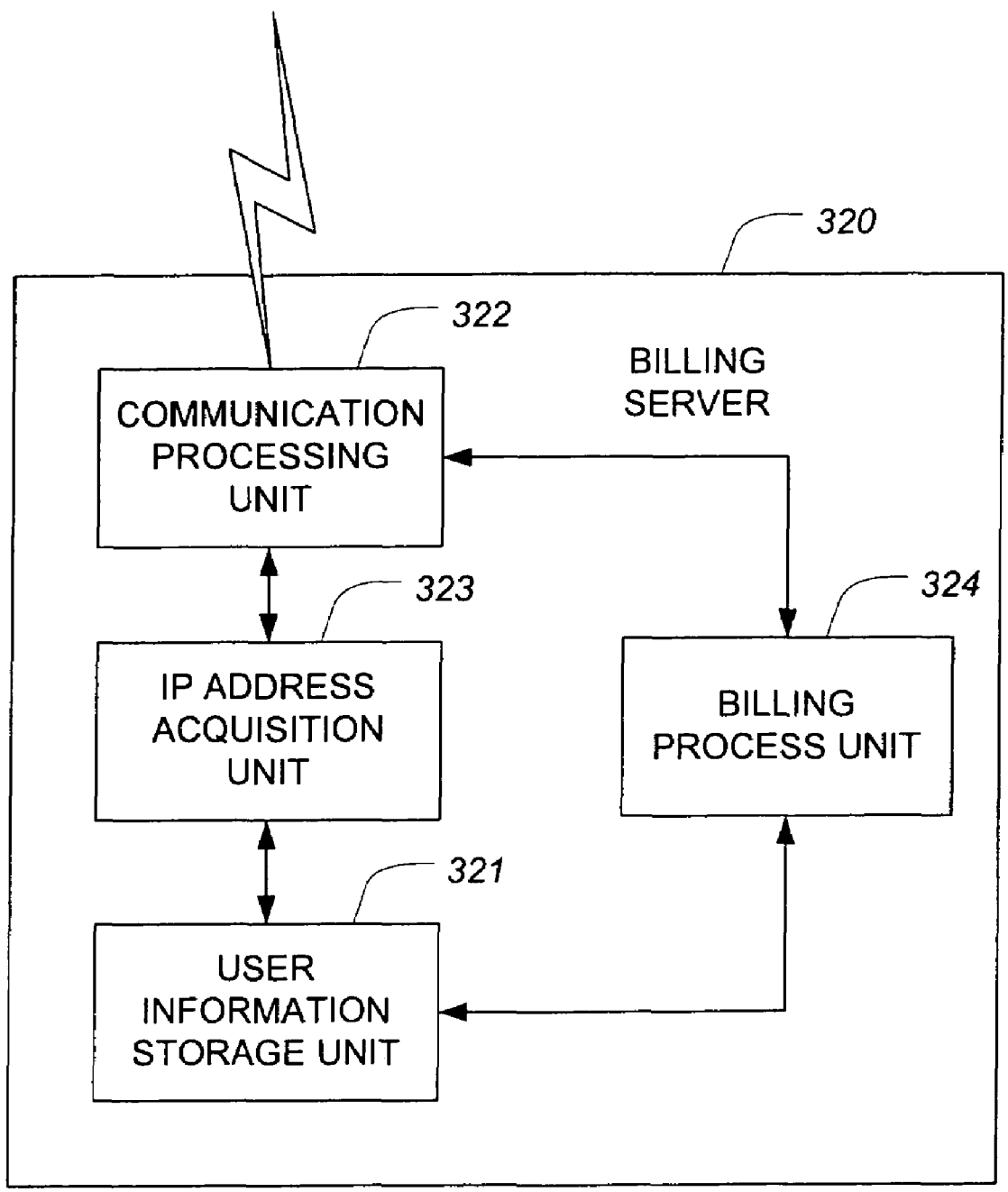
FIG. 9 is a functional block diagram showing an example of the processing function of a billing server.

FIG. 9 shows a functional block diagram showing an example of the processing function of the billing server. The billing server 320 includes a user information storage unit 321, a communication processing unit 322, an IP address acquisition unit 323 and a bill processing unit 324.

The user information storage unit 321 has stored therein the information on the user who is under a use contract for a portable telephone set. The contents of the user information storage unit 321 will be explained subsequently.

The communication processing unit 322 conducts data communication over the Internet 21 or the public network 22.

The IP address acquisition unit 323 periodically transmits a request for IP address information to the accessing server 330, and acquires the IP address allocated to each portable telephone set from the accessing server 330. The IP address acquisition unit 323 registers the acquired IP address of each portable telephone set in the user information storage unit 321.

The bill processing unit 324 is responsive to a request from the application server 100 to bill the user's account for the cost of the content.

FIG. 10 shows an example of a data structure of the user information storage unit. In the example of FIG. 10, the user information storage unit 321 includes the items of user ID, telephone numbers, user names, account numbers and IP addresses. The information of each column lying in the same row for each item in the user information storage unit 321 (the horizontally arrayed information in the drawing) are correlated with each other.

In the item of the user ID, there is stored the identification information by which the user who is under a use contract for a portable telephone set can be identified.

In the item of the user telephone number, there is registered the telephone number of the portable telephone set which the user is using.

In the item of the user name, there is registered the name of the user.

In the item of the account number, there is registered information on the account for automatic direct debit of the usage rate for the portable telephone set. For example, the registered information may include the name of a bank or its branch office where the account for direct debit is located. The type of account (savings account or current account) or the account number.

In the item of the IP address, there is registered the IP address allocated to the user's portable telephone set. The IP address is incidentally updated by an IP address acquisition unit 323.

Figure 11:
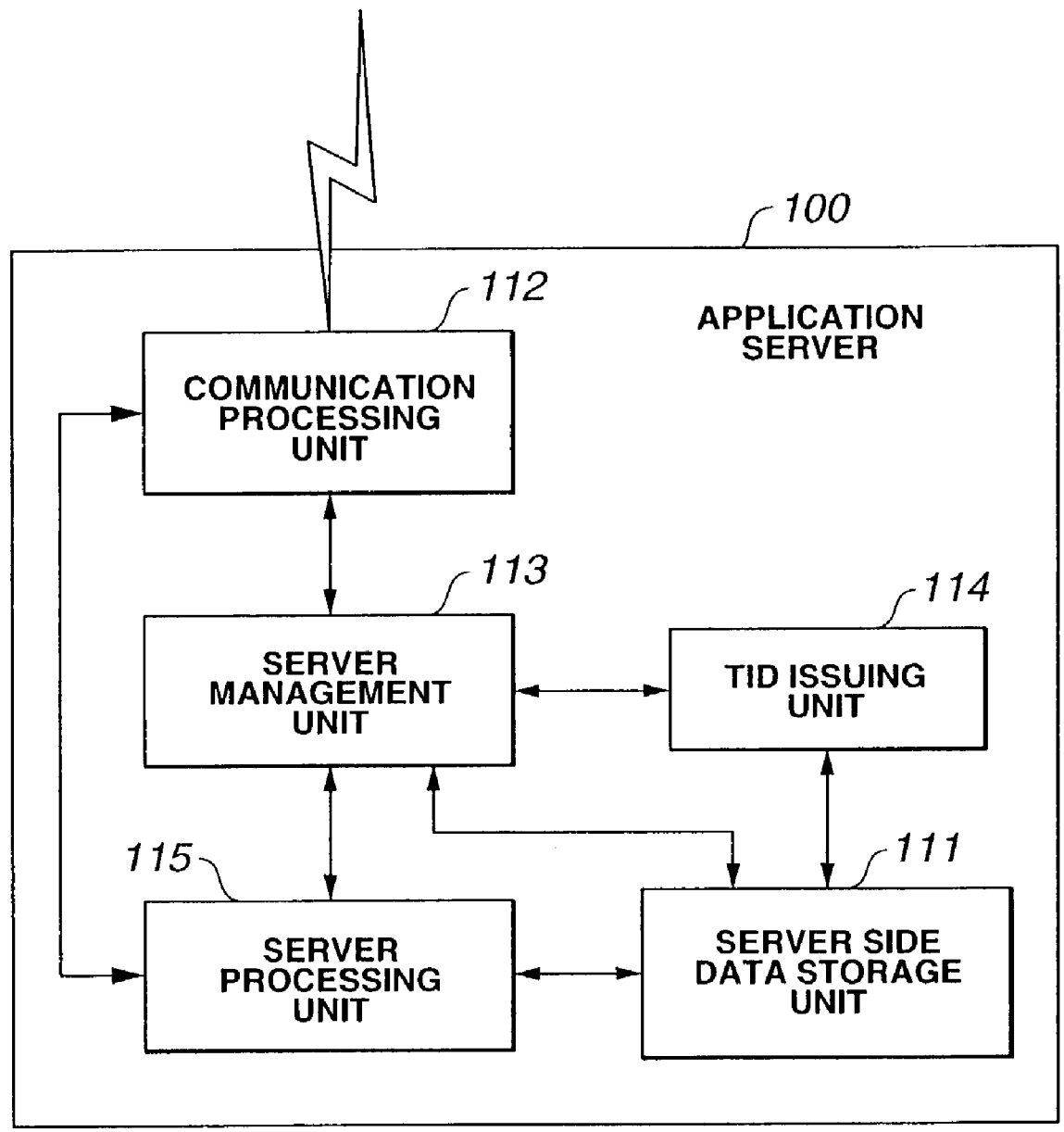
FIG. 11 is a block diagram showing an example of the processing function of an application server.

FIG. 11 is a block diagram showing a typical processing function of the application server. The application server 100 includes a server side data storage unit 111, a communication processing unit 112, a server management unit 113, a TID issuing unit 114, and a server processing unit 115.

The server side data storage unit 111 has stored therein management information for each issued transaction ID. The server side data storage unit 111 will be explained in detail subsequently.

The communication processing unit 112 performs communication over the Internet 21. For example, the communication processing unit 112 receives a message from the portable telephone set 200 or from the terminal device 400 and delivers the message to the server management unit 113. The communication processing unit 112 also transmits messages received from the server management unit 113 to the portable telephone set 200 or to the terminal device 400.

Through the communication processing unit 112, the server management unit 113 exchanges messages with the portable telephone set 200 or with the terminal device 400 and executes processing corresponding to the message. For example, on receipt from the portable telephone set 200 of a message including a request for issuance of a TID, the server management unit 113 requests that the TID issuing unit 114 issue the TID. On issuance of a new TID by the TID issuing unit 114, the server management unit 113 transmits the issued TID to the portable telephone set 200. The server management unit 113 also supervises data of the server side data storage unit 111.

The TID issuing unit 114 is responsive to the request from the server management unit 113 to issue a unique TID (for example, a sequential number). The TID issuing unit 114 delivers the issued TID to the server management unit 113.

The server processing unit 115 executes processing in accordance with a request from the server management unit 113 and returns the processing result to the server management unit 113. For example, on receipt of a request to bill a particular user for purchase of certain content from the server management unit 113, the server processing unit 115 transmits a message to request billing to the billing server 320 through the communication processing unit 112. On receipt of the results of the billing process from the billing server 320, the server processing unit 115 advises the server management unit 113 of the results of the billing process.

FIG. 12 shows a typical data structure of the server side data storage unit. In the example of FIG. 12, the server side data storage unit 111 includes the items of TID, processing requests, and unprocessed billing flags. It is noted that data of the same rows of the respective items of the server side data storage unit 111 (data arrayed horizontally in the drawing) are correlated with one another.

In the item of the TID, there are arrayed TIDs, conferred to the processing request and sent in this state to the application server 100.

In the item of the processing request, there is arrayed the processing request sent with the TID.

In the item of the unprocessed billing flag, there is set a flag indicating whether or not the process of billing has come to a close (unprocessed billing flags). If, for example, the unprocessed billing flag is 1, it indicates that the process of billing has not come to a close. If the unprocessed billing flag is 0, it indicates that the process of billing has come to a close. That is, when the unprocessed billing flag is set to 0, the set of the TID and the processing request has the meaning as process completion information, that is, information that the process pertinent to the processing request has come to a close.

Figure 13:
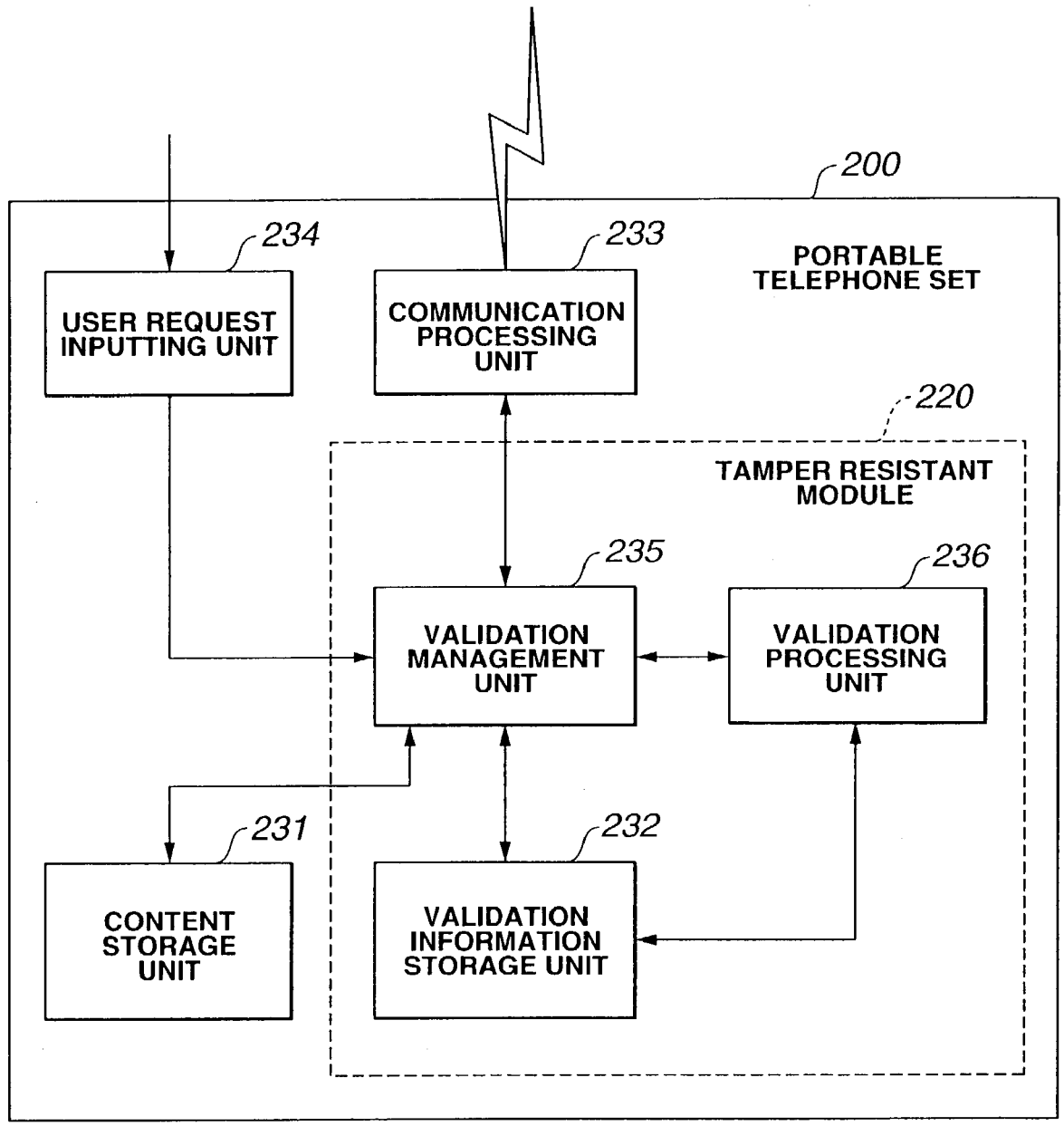
FIG. 13 is a functional block diagram showing an example of the processing function of a portable telephone set.

FIG. 13 shows a functional block diagram showing an illustrative example of the processing function of a portable telephone set. The portable telephone set 200 includes a content storage unit 231, a validation information storage unit 232, a communication processing unit 233, a user request inputting unit 234, a validation management unit 235 and a validation processing unit 236. The functions of the validation information storage unit 232, validation management unit 235 and validation processing unit 236 are those implemented within the tamper resistant module 220.

The content storage unit 231 is, for example, at least a portion of the storage area of the semiconductor memory 214. The content storage unit 231 stores the content downloaded from the content server 310.

The validation information storage unit 232 stores sets of the TIDs and the processing requests.

The communication processing unit 233 communicates with devices on the Internet 21 via the accessing server 330.

The user request inputting unit 234 accepts operating inputs from the operating key 211 or dial 212 and delivers a request corresponding to the operating input to the validation management unit 235.

The validation management unit 235 exchanges messages with the application server 100 through the communication processing unit 233 to perform the processes corresponding to the messages. The validation management unit 235 is also responsive to a request from the user request inputting unit 234 to generate processing requests. The generated processing requests may, for example, be a content downloading request, a TID acquisition request or a bill processing request. The validation management unit 235 transmits the messages including the generated processing requests over the communication processing unit 233 to the application server 100 and to the content server 310. Meanwhile, the TID is added to the message requesting bill processing.

On the other hand, the validation management unit 235 executes preset processes based on data or information sent from the application server 100 and from the content server 310. For example, the validation management unit 235 stores data, such as content downloaded from the content server 310, in the content storage unit. When a message requesting bill processing and having a TID added thereto is sent to the application server 100, the validation management unit 235 stores the combination of the TID and the processing request message in the validation information storage unit 232. On receipt of a completion notice regarding the bill processing from the application server 100, the validation management unit 235 deletes the corresponding information from the validation information storage unit 232, while instructing the validation processing unit 236 to execute the process for validation.

The validation processing unit 236 validates the content stored in the content storage unit 231 under instructions from the validation management unit 235. For example, the validation processing unit 236 decodes encrypted content. On the other hand, a terminal having a copyright protecting function executes the process of validating the content key in the system.

FIG. 14 shows an illustrative data structure of the content storage unit. In the structure of FIG. 14, the content storage unit 231 includes the items of content ID, content data and decoding keys. The information in the same row for each item of the content storage unit 231 (horizontally arrayed information in the drawing) are correlated with one another.

In the content ID item, the content IDs of the content downloaded to the portable telephone set 200 are stored.

In the content data item, the main data of the content downloaded to the portable telephone set 200 are stored.

The decoding key item, the decoding keys of the content downloaded to the portable telephone set 200 are stored.

FIG. 15 shows an illustrative data structure of the validation information storage unit. In the structure of FIG. 15, the validation information storage unit 232 includes the TIDs and the processing requests. The information in the same row for each item of the validation information storage unit 232 (the horizontally arrayed information in the drawing) are correlated with one another.

In the TID item, there are stored the TIDs issued from the application server 100 to the portable telephone set 200.

In the item of the processing requests, the processing requests having the TIDs added thereto and transmitted in this form to the application server 100, are stored in association with the TIDs thus added thereto.

Meanwhile, the processing function of the terminal device 400 is the same as that shown in FIG. 13 for the portable telephone set 200.

Taking the example of validating the content in the portable telephone set 200, the processing in a preferred embodiment of the present invention is explained.

Figure 16:
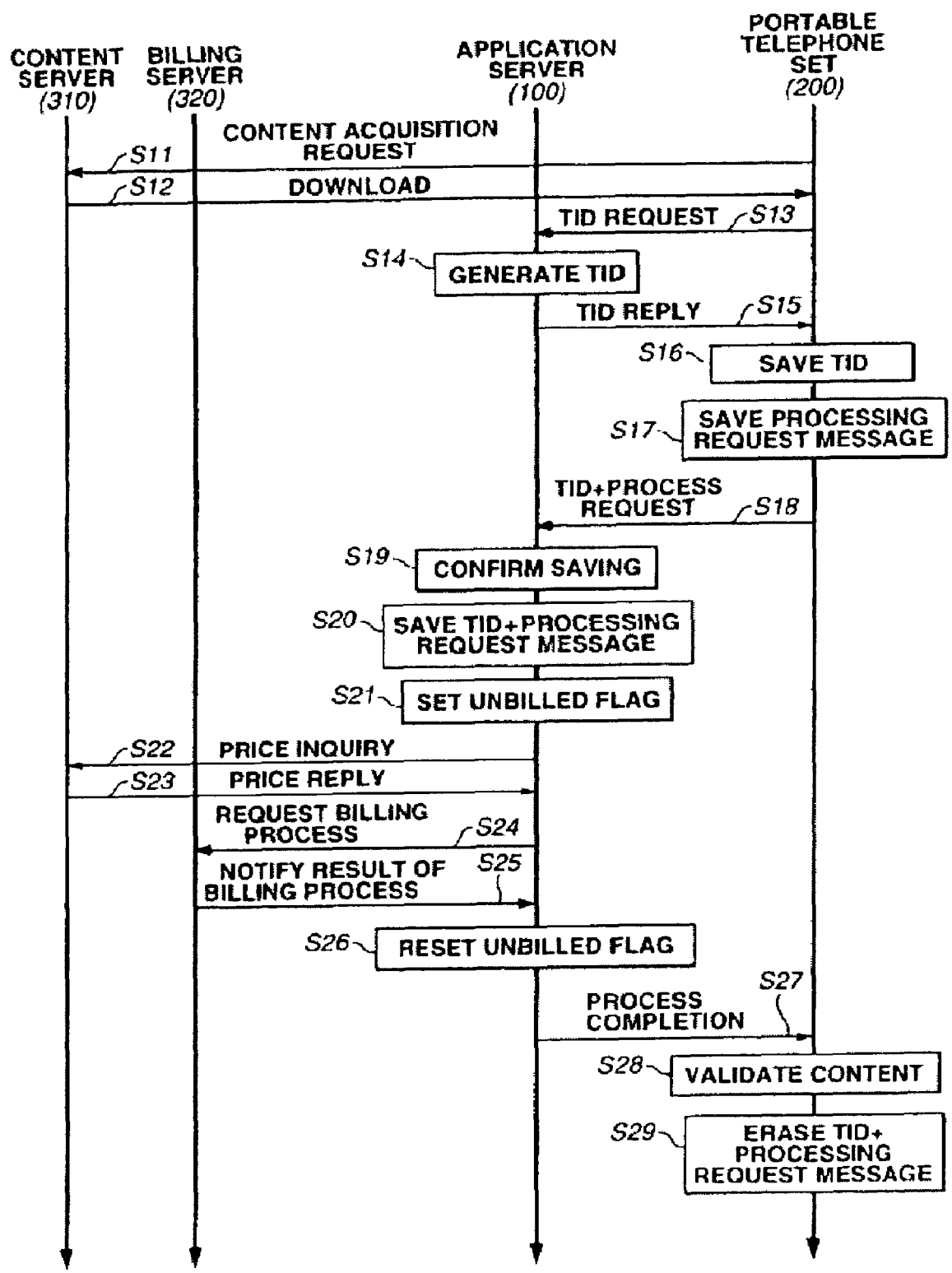
FIG. 16 is a sequence diagram for transactions at the time of validating the content by a portable telephone set.

FIG. 16 shows a sequence diagram of a transaction to validate the content in a portable telephone set. FIG. 16 shows a transaction for a normal system where no malfunction is occurring. Content server 310, billing server 320 and the application server 100 are operating at all times. The specified processing in the application server 100 and in the portable telephone set 200 will be explained with reference to the flowcharts of FIGS. 17 to 19.

First, on power up, the portable telephone set 200 is responsive to the user's operating input to transmit the content acquisition request to the content server 310 (step S11).

The content server 310 responds to the content acquisition request from the portable telephone set 200 by downloading the specified content to the portable telephone set 200 (step S12). The downloaded content includes the content ID and the decoding key for the content.

Specifically, the content providing unit 313 of the content server 310 acquires the content specified by the content acquisition request, the content ID of the content and the decoding key from the content information storage unit 311. The content providing unit 313 transmits a combination of the content, the content ID and the decoding key to the portable telephone set 200. The validation management unit 235 of the portable telephone set 200 receives the combination of the content, the content ID and the decoding key and stores this information in the content storage unit 231.

On acquisition of the content, the portable telephone set 200 is responsive to the user's operating input to transmit a TID request to the application server 100 (step S13). Meanwhile, the user's operation input may be eliminated, so that the TID request may be transmitted after content acquisition. On receipt of the TID request message from the portable telephone set 200, the application server 100 generates the TID (step S14). The application server 100 returns the TID to the portable telephone set 200 (step S15). The portable telephone set 200 saves the TID sent from the application server 100 (step S16).

The portable telephone set 200 is responsive to the user's operating input to generate and save a processing request message (step S17). The user's operation input may be eliminated, so that the processing request message may immediately be generated and saved after step S16. The portable telephone set 200 sends the processing request message, having the TID added thereto, to the application server 100 (step S18).

On receipt of the processing request message, having the TID added thereto, the application 100 serves checks whether or not a processing request having the same TID has already been saved (step S19). If the relevant processing request has not been saved, the application server 100 saves the TID and the processing request message (step S20). For the combination of the TID and the processing request message thus saved, the application server 100 sets the unbilled flag to 1 (step S21).

The application server 100 specifies the content ID and inquires of the content server 310 as to the price of the content (step S22). On receipt of the inquiry from the application server 100, the content server 310 returns the price of the content (step S23). Specifically, the content providing unit 313 references the content information storage unit 311 to acquire the price associated with the content ID specified in the price inquiry. The content providing unit 313 transmits the acquired price to the application server 100.

The application server 100 specifies the IP address of the portable telephone set 200 and transmits a bill processing request for the price sent from the content server 310 to the billing server 320 (step S24).

The billing server 320 executes the process of billing responsive to the request for bill processing from the application server 100, and transmits the processing results to the application server 100 (step S25). Specifically, the bill processing unit 324 references the user information storage unit 321 to determine the user to be billed based on the IP address specified in the request for billing process from the application server 100. Based on the account number of the user to be billed, the bill processing unit 324 accesses the server of a financial organization supervising the account (not shown) to request the server to directly debit the amount equivalent to the price of the content from the account of the user to be billed. It is also possible for the cost of the content directly debited to be automatically transferred to the account of the supervisor of the content server 310.

It is also possible to add the cost of the content to the usage rate of the portable telephone set to directly debit the cost of the content at the time of direct debiting of the usage rate for the portable telephone set, without immediately proceeding to direct debiting from the account. In this case, the bill processing is deemed to be completed when the process of summing the cost of the content to the usage rate of the portable telephone set is completed.

The results of the direct debiting process are notified from the server of the financial organization to the billing server 320. For example, a completion notice of direct debiting or a failure notice of direct debiting is sent to the billing server 320. The bill processing unit 324 of the billing server 320 notifies the results of the direct debiting process as being the result of the billing process to the application server 100 (step S25).

On receipt of the notice indicating the completion of the direct debiting, the application server 100 resets the unbilled flag, that is, sets the unbilled flag to zero (step S26). The application server 100 transmits a process completion notice to the portable telephone set 200 (step S27).

On receipt of the process completion notice, the portable telephone set 200 executes the process of validating the content, for example, decoding (step S28). The validated content is now usable freely in the portable telephone set 200. For example, if the content is music data, the music data can be reproduced using the portable telephone set 200. Finally, the portable telephone set 200 erases the combination of the TID and the processing request message (step S29). Finally, the set of the TID and the processing request message is erased to provide for effective utilization of the storage area as well as to prevent illicit use of the TID.

Content concealed by, e.g., encryption, may be downloaded to the portable telephone set 200 and, subject to payment of the cost of the content, the content may be validated in the manner described above. Moreover, in the present embodiment, the TID is assigned to the processing request for billing the cost of the contents, with the TID then being saved in the application server 100. Thus, even if the billing process has been executed but the completion notice has not been sent to the portable telephone set 200 due to a network malfunction, etc., the completion notice can be positively received by re-transmitting the processing request message along with the TID to the application server 100.

By referring to the flowchart, the processing by the application server 100 and the portable telephone set 200, which takes account of the possible occurrence of network malfunctions, is now explained.

Figure 17:
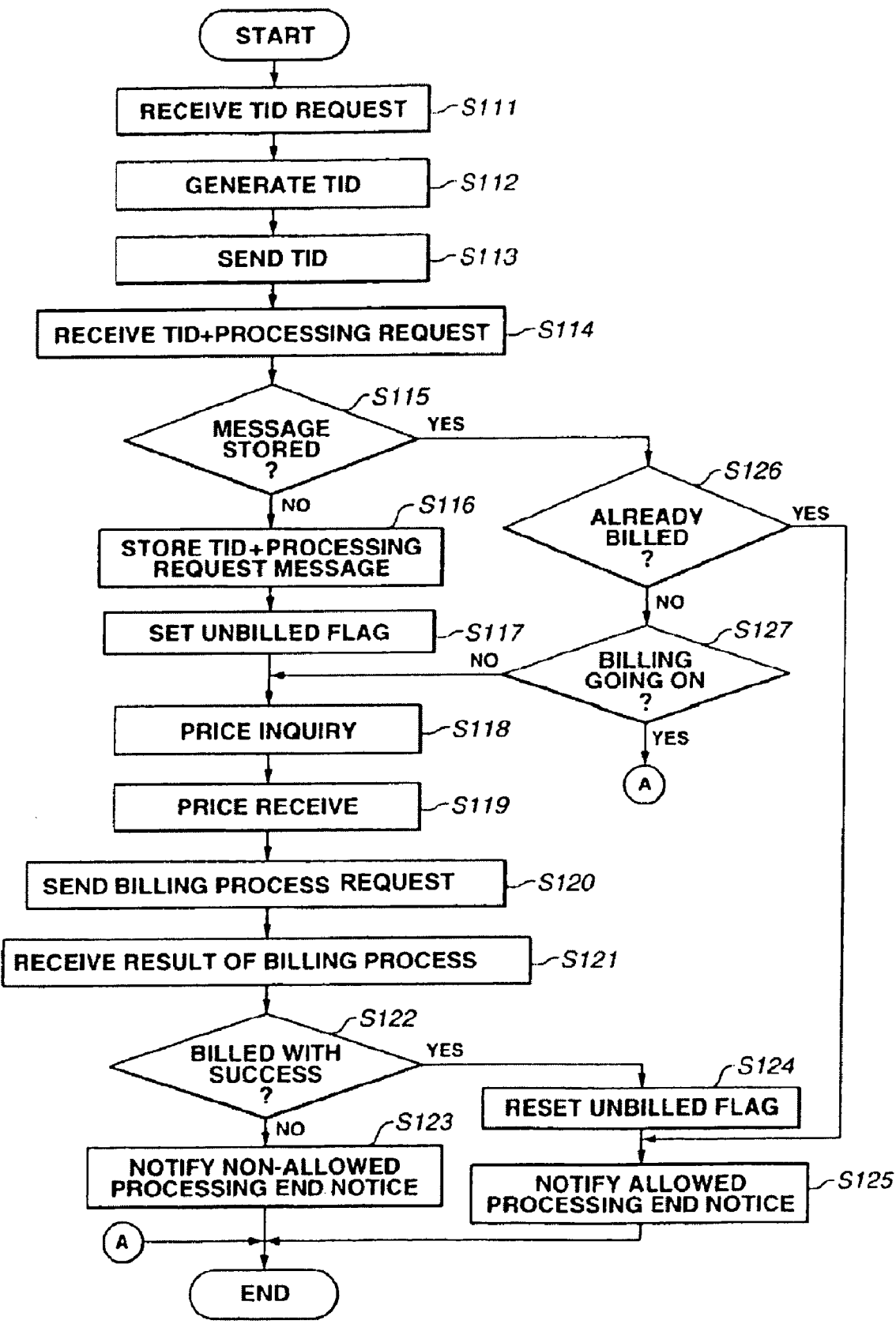
FIG. 17 is a flowchart showing the processing sequence of an application server.

FIG. 17 is a flowchart showing the processing sequence of the application server. The processing sequence shown in FIG. 17 is explained in the order of increasing step numbers.

In step S111, the server management unit 113 receives a TID request from the portable telephone set 200.

In step S112, the server management unit 113, which has received the TID request, issues a request to the TID issuing unit 114 to send a TID. The TID issuing unit 114 generates a unique TID in the application server 100 and delivers the generated TID to the server management unit 113.

In step S113, the server management unit 113 returns the TID, received from the TID issuing unit 114, as reply data to the portable telephone set 200.

In step S114, the server management unit 113 receives a processing request message, with the TID added thereto, from the portable telephone set 200.

It is noted that the content ID and the IP address of the source of transmission are contained in the processing request message. Consequently, the server management unit 113 is able to specify the portable telephone set 200 as the source of transmission by the IP address.

In step S115, the server management unit 113 checks whether or not the processing request message associated with the TID, which is the same as that of the TID assigned to the processing request message received at step S114, has been stored in the server side data storage unit 111. When the processing request message of the same TID is stored in the server side data storage unit 111, it indicates that the same processing request was received in the past. So, the process transfers to step S126. When the processing request message of the same TID is not stored in the server side data storage unit 111, it indicates that the processing request is a new one. Thus, the processing transfers to step S116.

In step S116, the server management unit 113 stores the combination of the TID and the processing request message in the server side data storage unit 111.

In step S117, the server management unit 113 sets an unbilled flag corresponding to the combination of the TID and the processing request message stored at step S116. For example, the server management unit 113 sets the unbilled flag to 1.

In step S118, the server management unit 113 specifies the content ID, contained in the processing request message, and inquires as to the price of the content from the content server 310.

In step S119, the server management unit 113 receives the price from the content server 310.

In step S120, the server management unit 113 requests the server processing unit 115 to execute bill processing. The server processing unit 115 is responsive to the request from the server management unit 113 and sends a request for bill processing to the billing server 320. Meanwhile, the cost of the content and the IP address of the portable telephone set 200 are contained in the request for bill processing.

In step S121, the server management unit 113 receives the results of bill processing from the billing server 320.

In step S122, the server management unit 113 checks whether the billing has been finished with success. If a completion notice of direct debiting has been received from the billing server 320, the server management unit 113 verifies that the billing has been finished with success, whereas, if a failure notice in direct debiting has been received from the billing server 320, the server management unit 113 verifies that the billing has not been finished with success. If the billing has been finished with success, processing transfers to step S124, whereas, if the billing has not been finished with success, processing transfers to step S123.

In step S123, the server management unit 113 sends a notice of process completion with non-allowance to the portable telephone set 200 to terminate the process.

In step S124, the server management unit 113 resets the unbilled flag corresponding to the TID received at step S114. For example, the server management unit 113 sets the value of the unbilled flag to zero.

In step S125, the server management unit 113 send a notice of process completion with allowance of content validation to the portable telephone set 200 to terminate the process.

In step S126, on receipt of a combination of a processing request message and a TID which have already been stored, the server management unit 113 verifies whether the billing for the combination of the TID and the processing request message has been finished. This can be verified by referring to the unbilled flag. If the unbilled flag has been set (the value of the unbilled flag being 1), the billing has not been finished, whereas, if the unbilled flag has not been set (the value of the unbilled flag being 0), the billing has been finished.

If the billing has been finished, processing transfers to step S125 and the notice of the process completion with allowance of the content validation is transmitted to the portable telephone set 200 (step S125). Thus, if the billing has been finished, the notice of process completion is transmitted without repetitive execution of the bill processing. If the billing has not been finished, processing transfers to step S127.

In step S127, the server management unit 113 verifies whether the billing process is progressing. That is, the server management unit 113 verifies whether the results of bill processing for the bill processing request corresponding to the processing request indicated by the TID has been received from the billing server 320. If the billing process is underway, there is no need to output bill processing requests repeatedly so that processing is terminated. If the billing has not been made, with the billing process not being underway, processing transfers to step S118 to execute the processing pertinent to the request for bill processing.

By so doing, there is no risk of duplex billing even if bill processing responsive to the processing request message has been time-consuming such that the processing request message with the same TID is re-transmitted before completion of the billing process.

Figure 18:
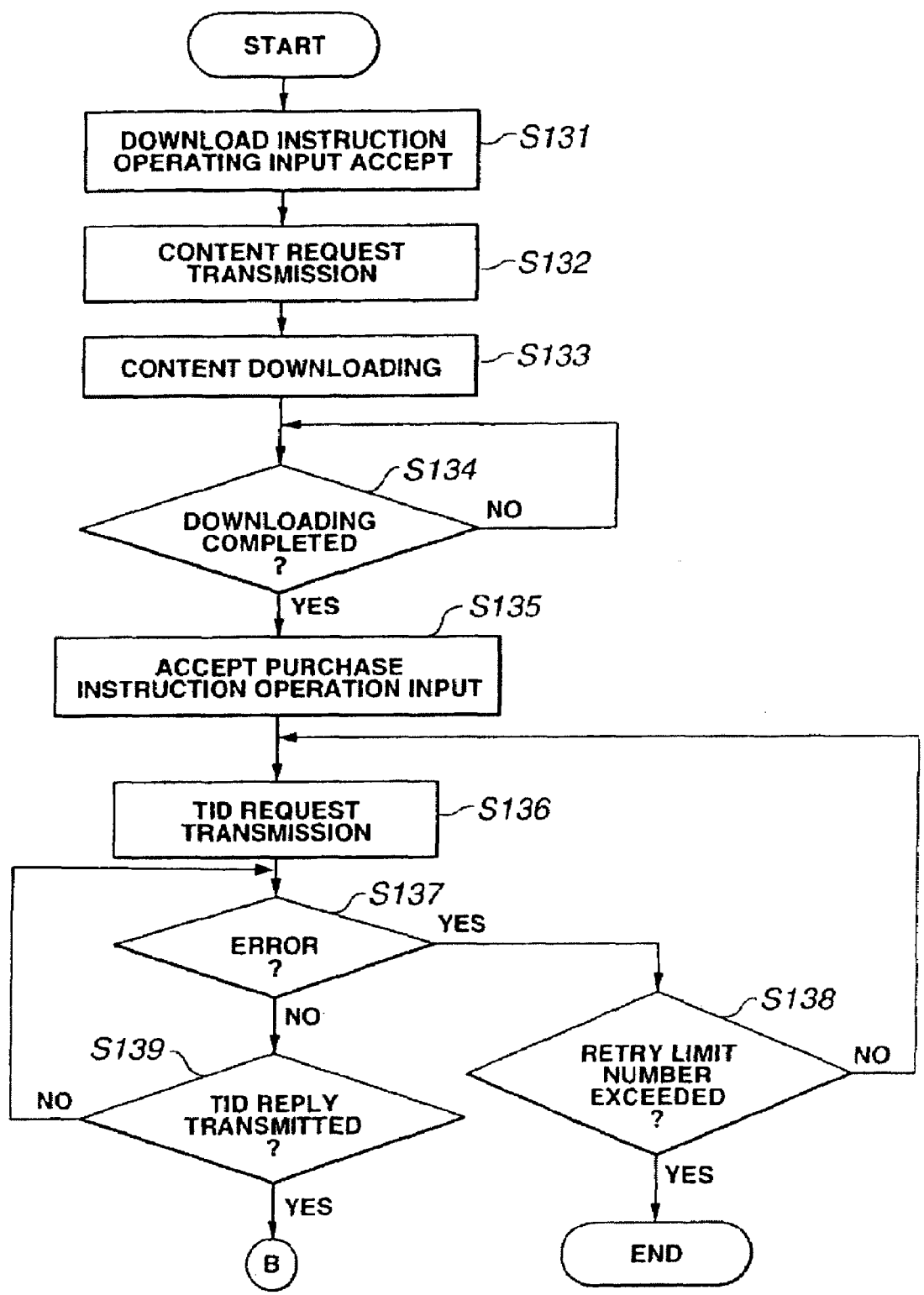
FIGS. 18 and 19 are flowcharts showing the processing sequence of a portable telephone set.

FIG. 18 shows a first portion of a flowchart showing the processing sequence of a portable telephone set. The following is an explanation of the process shown in FIG. 18, in order of increasing step numbers.

In step S131, when the power supply of the portable telephone set 200 is turned on by a user, the user request inputting unit 234 accepts an operating input from the user instructing that content be downloaded. When an operating input is made instructing that contact be downloaded, the user request inputting unit 234 delivers the content downloading request to the validation management unit 235.

In step S132, the validation management unit 235 is responsive to the request from the user request inputting unit 234 and transmits a request for content acquisition to the content server 310. It is noted that the request for content acquisition may be transmitted after step S131.

In step S133, the validation management unit 235 downloads the content from the content server 310 for storage in the content storage unit 231.

In step S134, the validation management unit 235 verifies whether the downloading of the content (combination of the content, content ID and decoding key) has come to a close. Whether the downloading has come to a close can be verified based on whether the content size as informed in advance from the content server 310 coincides with the size of the data stored in the content storage unit 231.

When the downloading has come to a close, the process transfers to step S135. When the downloading has not come to a close, the processing of step S134 is repeated to set a standby state until completion of the downloading. It is also possible to omit the processing of step S135 and transmit the TID request of step S136.

In step S135, the user request inputting unit 234 accepts the operating input of instructions for content purchase from the user. If the operating input for purchase is made, the user request inputting unit 234 delivers a content purchase request to the validation management unit 235.

In step S136, the validation management unit 235 is responsive to the request from the user request inputting unit 234 and sends a TID request to the application server 100.

In step S137, the validation management unit 235 verifies whether a communication error has occurred before receipt of a reply from the TID request. For example, if no reply to the TID request is returned within a preset time, the validation management unit 235 verifies the situation to be ascribable to a communication error. If a communication error has occurred, the process transfers to step S138 and, if otherwise, the process transfers to step S139.

In step S138, the validation management unit 235 verifies whether a preset retry limit number of times for the TID request has been exceeded. If the retry limit number of times for the TID request has been exceeded, processing is terminated, whereas if the retry limit number of times for the TID request has not been exceeded, processing transfers to step S136 to re-transmit the TID request.

In step S139, the validation management unit 235 verifies whether a TID reply has been received. If a TID reply has not been received, the process transfers to step S137. The validation management unit 235 then is in a standby state for a TID reply until a communication error occurs. If a TID reply has been received, processing transfers to step S140 shown in FIG. 19.

Figure 19:
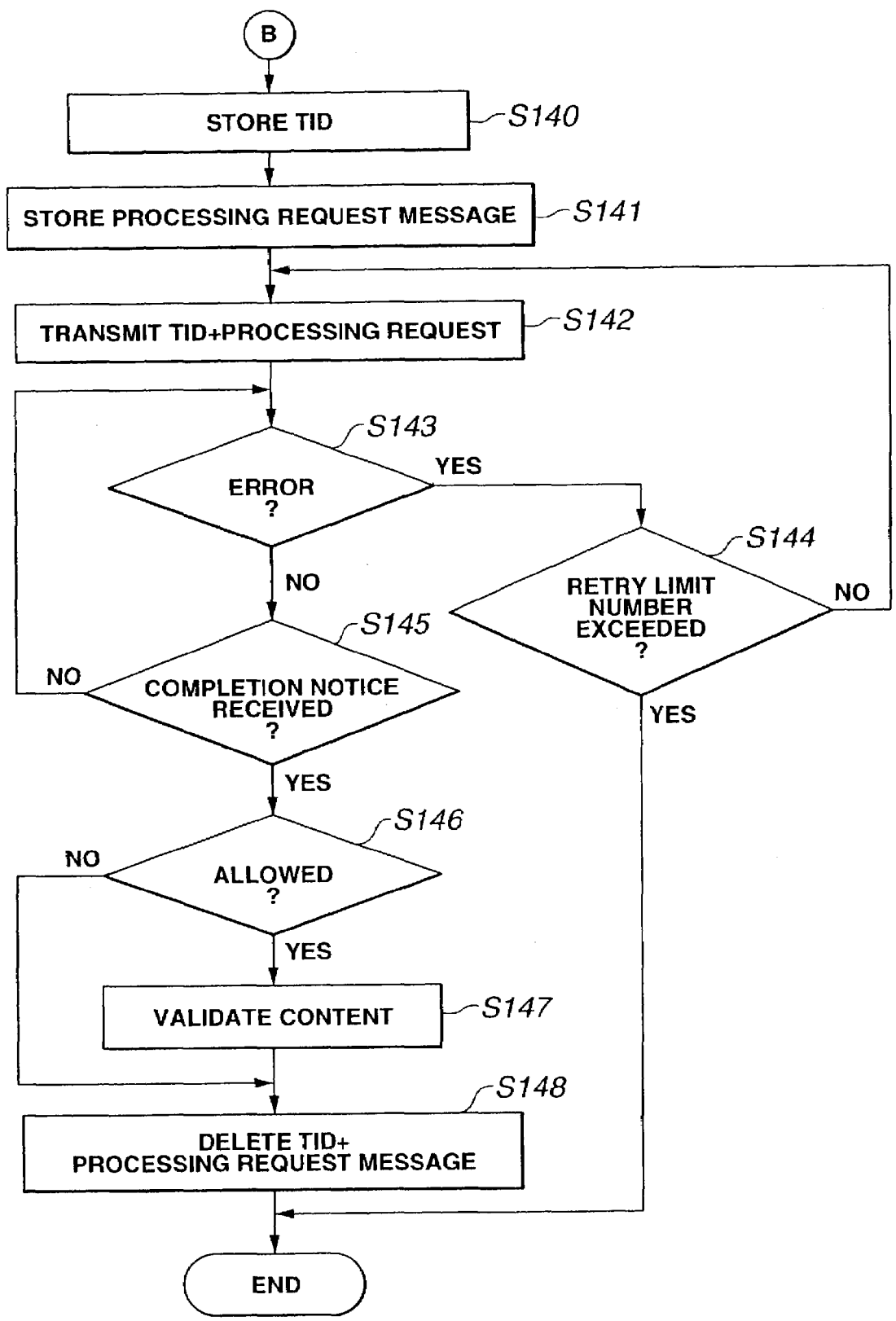

FIG. 19 shows a second portion of the flowchart showing the processing sequence of the portable telephone set. The following is an explanation of the process shown in FIG. 19, in order of increasing step numbers.

In step S140, the validation management unit 235 stores the TID sent from the application server 100 in the validation information storage unit 232.

In step S141, the validation management unit 235 generates a processing request message for bill processing for the content purchase cost and stores the generated message in the validation information storage unit 232 in association with the TID stored at step S140.

In step S142, the validation management unit 235 transmits a combination of the TID and the processing request message to the application server 100.

In step S143, the validation management unit 235 verifies whether a communication error has occurred. For example, if a completion notice is not returned after the lapse of a preset time from the transmission of the combination of the TID and the processing request message, the validation management unit 235 verifies this situation as being due to a communication error. If such communication error has occurred, the process transfers to step S144. If no communication error has occurred, the process transfers to step S145.

In step S144, the validation management unit 235 verifies whether a limit on the retry number of times for the bill processing has been exceeded. If the limit on the retry number of times has been exceeded, the process is terminated without deleting the TID and the processing request message. This enables a processing request message for bill processing to be re-transmitted, using the TID and the processing request message stored as described above, on restoration of the network's communication environment. If the limit on the retry number of times has not been exceeded, the process transfers to step S142 to re-transmit the processing request message for bill processing.

In step S145, the validation management unit 235 verifies whether a completion notice for the bill processing has been received from the application server 100. On receipt of the completion notice, the process transfers to step S146. If the completion notice has not been received, the process transfers to step S143 to await the transmission of the completion notice.

In step S146, the validation management unit 235 verifies whether the completion notice for the bill processing is a completion notice indicating the allowance of content validation. If the completion notice is one indicating the allowance of content validation, the process transfers to step S147 and, if otherwise, that is, the completion notice is one indicating the non-allowance of content validation, the process transfers to step S148.

In step S147, the validation management unit 235 requests that the validation processing unit 236 proceed to the process of content validation. The validation processing unit 236 is responsive to the request from the validation management unit 235 and validates the content. Specifically, the validation processing unit 236 decodes the content by a preset algorithm, using the decoding key associated with the content. Meanwhile, a terminal having the function of protecting the copyright protection performs a process of validating the content key within its system.

In step S148, the validation management unit 235 deletes the combination of the TID and the processing request message corresponding to the validated content from the validation information storage unit 232. The process then comes to a close.

This guarantees that the process of billing the purchase cost of the content and the process of validating the content are carried out as a set no matter at what time the network error occurs. That is, the content validation process is not performed unless the billing process for the content purchase cost is performed. On the other hand, once the billing process for the content purchase cost is carried out, the content validation process is performed.

For example, if the TID request or the TID reply is discarded, the application server 100 operates similarly to the ordinary system (processing shown in FIG. 16). When the portable telephone set 200 accepts an error from the lower network layer at the validation management unit 235, or when the reply awaiting state is sustained for longer than a preset time period, the portable telephone set re-sends the TID request.

When the combination of the TID and the processing request message has been discarded, the application server 100 operates similarly to the normal system. When the validation management unit 235 accepts an error from the lower network layer or when the reply awaiting state continues for longer than a preset time, the validation management unit 235 of the portable telephone set 200 re-transmits a processing request message which has the same content as that of the discarded message and to which has been added the TID.

If the completion notice for the process is discarded, the combination of the TID and the processing request message has already been saved in the server side data storage unit 111 of the application server 100. On receipt of the processing request message from the portable telephone set 200, with the same TID added to the processing request message, the application server 100 confirms whether a combination of the TID and the processing request message which is the same as the received combination has been stored in the server side data storage unit 111. If such set has been stored, the application server 100 re-transmits the notice of process completion without performing the requested process. If the validation management unit 235 accepts the error from the lower network layer or if the reply awaiting state exceeds a preset time, the validation management unit 235 of the portable telephone set 200 re-transmits a processing request message which has the same content as the discarded message and to which has been added the TID.

By the above-described rule, it is guaranteed that a certain process on the TID is carried out necessarily only once for both the application server 100 and the portable telephone set 200.

The above explanation has been made for the case of validating the content in the portable telephone set 200. The content can be validated by a substantially similar process in the terminal device 400. However, if the terminal device 400 is used, the content cost cannot be collected using a portable telephone usage fee collecting system, and hence a separate fee collection system becomes necessary.

For example, the user of the terminal device 400 makes a user registration in advance in the application server 100. The account number of a financial organization for direct debiting, etc., is pre-registered in the information for the registered user. Before placing a request for bill processing for the cost of the content, a user authentication process is carried out between the application server 100 and the terminal device 400.

Figure 20:
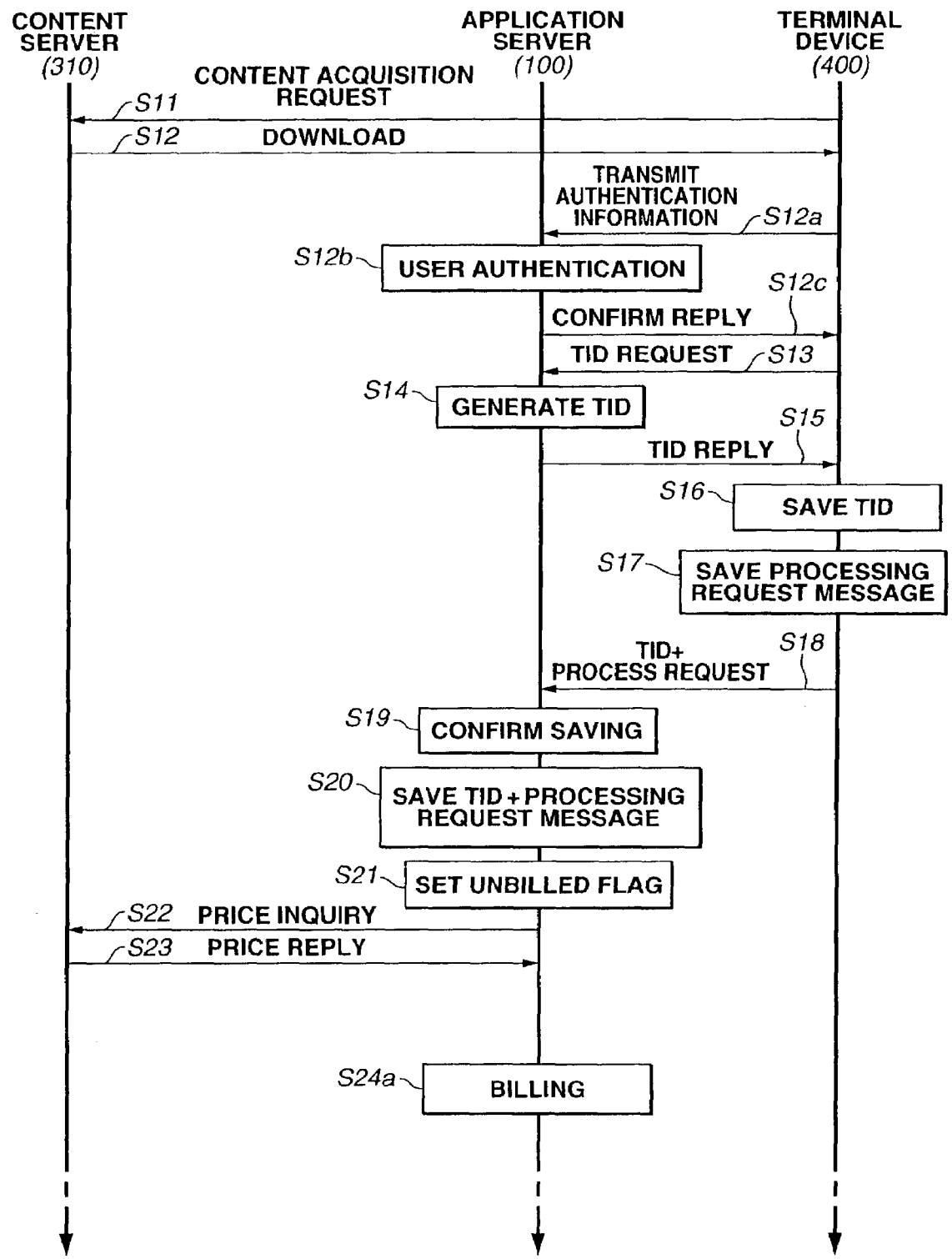
FIG. 20 is a sequence diagram for transactions at the time of validating the content by a terminal device.

FIG. 20 is a sequence diagram of a transaction to validate the content in the terminal device. In FIG. 20, the same process steps as those in FIG. 16 are depicted by the same step numbers and the explanation thereof is omitted for simplicity. The processing downstream of the billing process (step S24a) is similar to that shown in FIG. 16 and hence is not shown in FIG. 20.

In the following, only the points different from the case of using the portable telephone set in FIG. 16 are explained.

When the content is downloaded to the terminal device 400, authentication information is transmitted from the terminal device 400 to the application server 100 (step S12a). The authentication information is, for example, a combination of a password and a user ID, registered in advance in the application server 100.

On receipt of the authentication information, the application server 100 references the pre-registered user information to effect user authentication. That is, if user information matched to the combination of the user ID and the password has been registered, the user is specified. The authentication is then terminated as regularly. The application server 100 returns to the terminal device 400 a reply confirming that the authentication has been prosecuted as regularly.

If, in prosecuting the user authentication, a cookie (the scheme of exchanging information such as the user information or the access hysteresis between the Web browser and the Web server) is delivered from the application server 100 to the terminal device 400, it subsequently becomes unnecessary to prosecute user authentication each time the application server 100 is accessed from the terminal device 400.

The process from step S13 to step S23, following the user authentication, is similar to that in FIG. 16.

In the case of FIG. 20, bill processing is carried out in the application server 100 after inquiring as to the content price from the content server 310 (step S24a). In the bill processing, the application server 100 accesses a server (not shown) of a financial organization supervising the account based on the pre-registered user's account number. The application server 100 makes a request for direct debiting of an amount equivalent to the content price from the account of the user to be billed. The processing downstream of the billing process (step S24a) is similar to that shown in FIG. 16.

This allows the terminal device 400 to download content and to execute the process of payment of the content fee and the process of content validation as integrated processes.

In the above-described embodiment, the information on the account for billing the content cost is registered in advance in the application server 100 and in the billing server 320. Alternatively, the user information (such as credit number) may be transmitted from the portable telephone set 200 or the terminal device 400 to the application server 100 at the time of purchasing the content.

In the case of a device, such as the terminal device 400, in which data can be read out from an optical disc 15, the content may be acquired from the optical disc 15, without accessing the content server 310.

SECOND EMBODIMENT

A second embodiment of the present invention will now be explained. In the second embodiment, when the process of content validation in the portable telephone set 200 or in the terminal device 400 has come to a close, the TID associated with the process is deleted from the application server 100. This enables the hardware resources (such as the HDD storage area) of the application server 100 to be utilized effectively.

Figure 21:
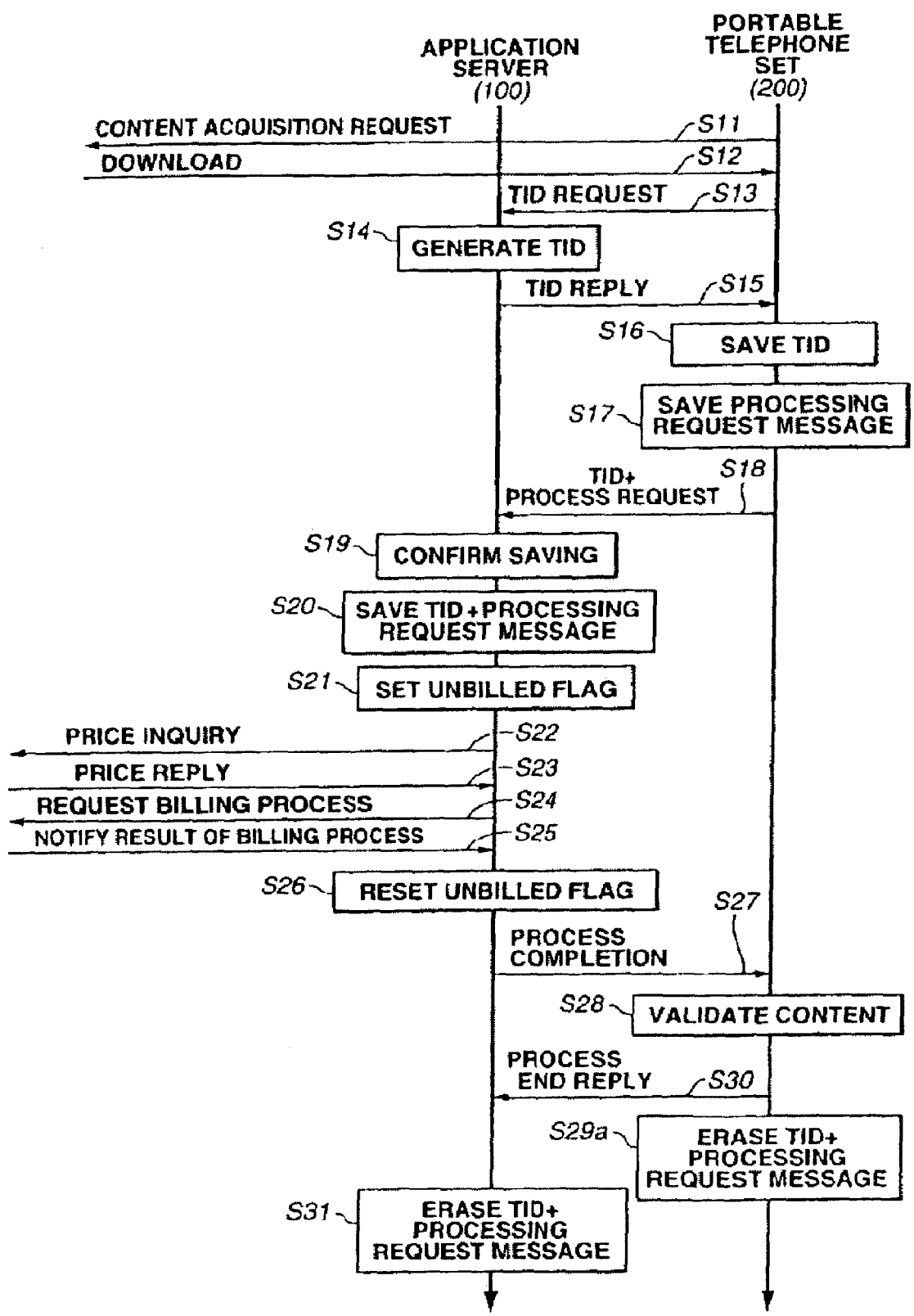
FIG. 21 is a sequence diagram for transactions at the time of validating the content in a second embodiment of the present invention.

FIG. 21 is a sequence diagram of a transaction to validate the content in the second embodiment of the present invention. FIG. 21 shows an example of content validation using the portable telephone set 200. In FIG. 21, processes similar to the processes shown in FIG. 16 are depicted by the same step numbers and the corresponding explanations are omitted for simplicity. Moreover, the processing by the content server 310 and the billing server 320 is the same as the processing of the first embodiment and hence the content server 310 and the billing server 320 are disregarded in FIG. 21.

When a notice of process completion is issued from the application server (step S27), and the portable telephone set 200 receives a notice of process completion to perform the process of content validation (step S28), a process end reply containing the TID is transmitted from the portable telephone set 200 to the application server 100 (step S30). After transmission of the process end reply, the portable telephone set 200 erases the combination of the TID and the processing request message (step S29a). On receipt of the processing end reply, the application server 100 erases the TID item from the server side data storage unit 111 (step S31).

This enables the server side data storage unit 111 of the application server 100 to be utilized effectively.

THIRD EMBODIMENT

A third embodiment of the present invention will now be explained. In the third embodiment of the present invention, there is provided a defensive function against a person with a malignant intention. That is, even if data or messages transmitted on the network are intercepted, the content cannot be validated except by a device used by a person who paid for the content.

Figure 22:
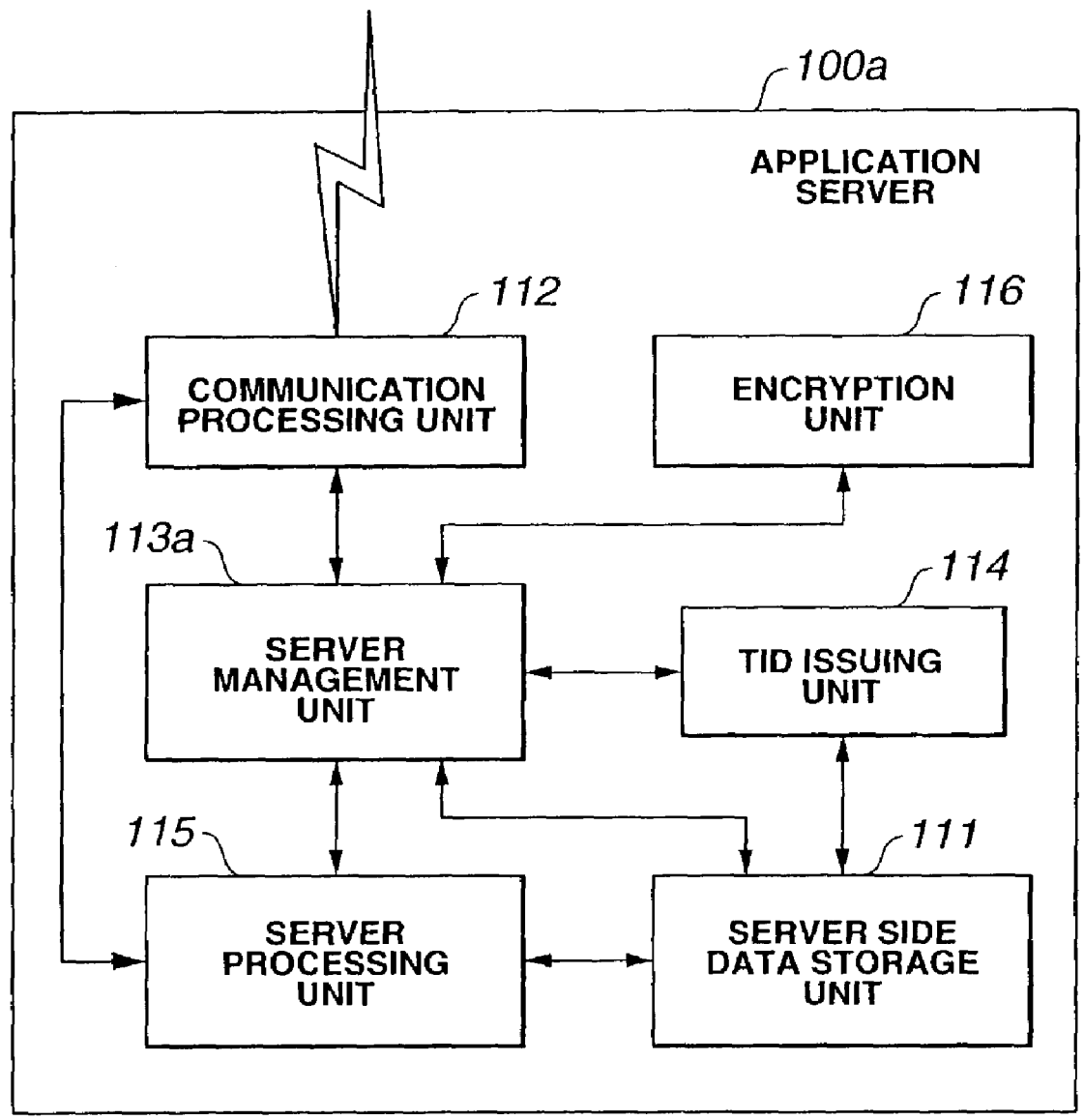
FIG. 22 is a block diagram showing the processing function of an application server in a third embodiment of the present invention.

FIG. 22 shows a block diagram illustrating the processing functions of an application server in the third embodiment of the present invention. In FIG. 22, parts or components having the same functions as those of the first embodiment are depicted by the same reference numerals as those used in the first embodiment shown in FIG. 11, and the corresponding description is omitted for simplicity.

An application server 100a of the third embodiment corresponds to the application server 100 of the first embodiment shown in FIG. 11 except that it includes an encryption unit 116. Additionally, the function of the server management unit 113 is changed to give a server management unit 113a.

The encryption unit 116 encrypts or decodes the message using a secret key co-owned with the client device, such as the portable telephone set.

The server management unit 113a includes the functions of requesting the encryption unit 116 to encrypt part of the information to be transmitted and to decode the encrypted information, in addition to the functions performed by the server management unit 113 shown in FIG. 11. The server management unit 113a also has the function of generating the encrypted message or of decoding and analyzing the encrypted message.

Figure 23:
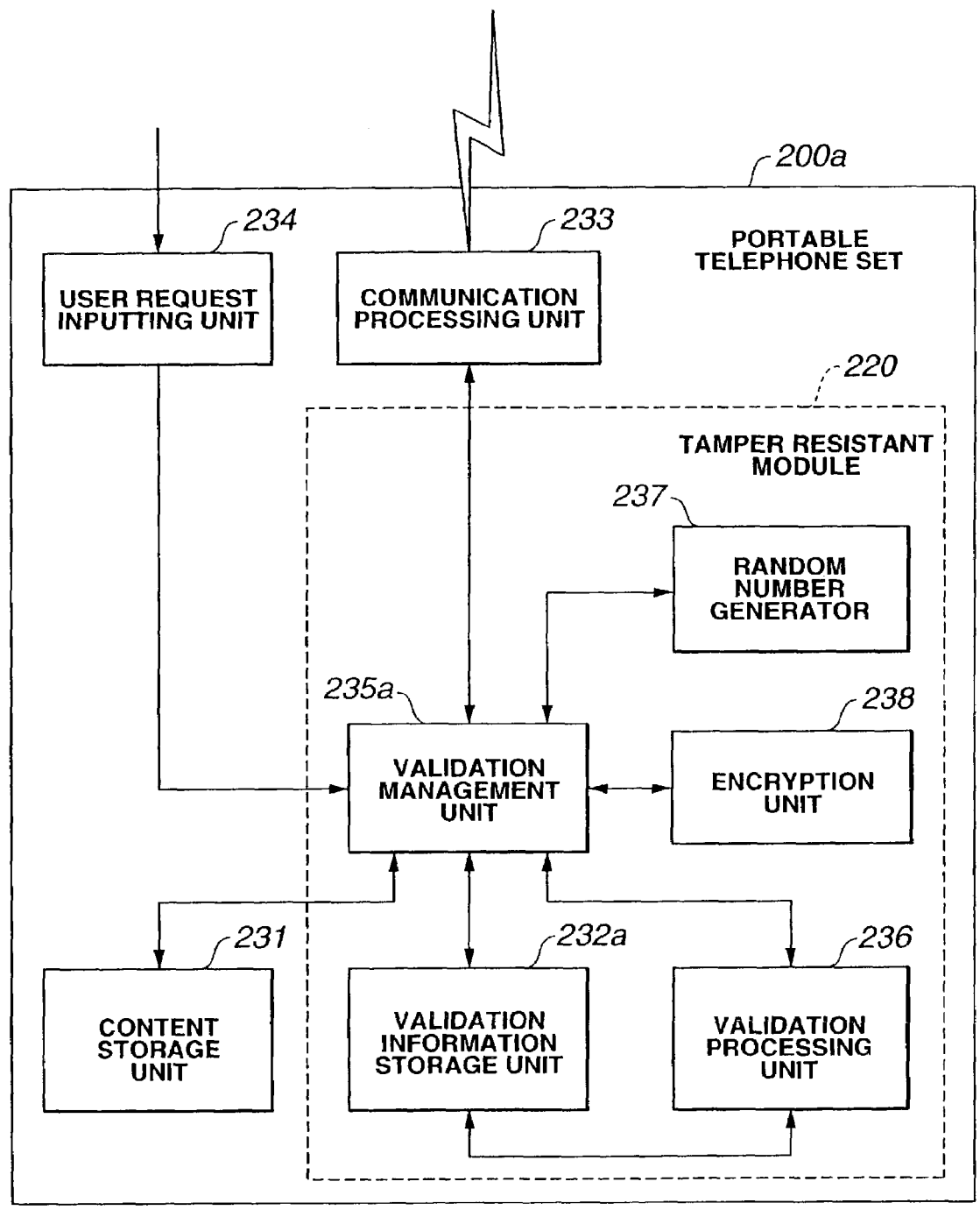
FIG. 23 is a block diagram showing the processing function of a portable telephone set in the third embodiment of the present invention.

FIG. 23 is a block diagram showing the processing functions of the portable telephone set according to the third embodiment of the present invention. In FIG. 23, parts or components having the same functions as those of the first embodiment are indicated by the same reference numerals as those used in FIG. 13 and the corresponding explanation is omitted for simplicity.

A portable telephone set 200a of the third embodiment of the present invention corresponds to the portable telephone set 200 of the first embodiment shown in FIG. 13, except that it includes random number generator 237 and an encryption unit 238. Additionally, the functions of the validation information storage unit 232 and the validation management unit 235 are changed to give a validation information storage unit 232a and a validation management unit 235a.

The random number generator 237 is responsive to a request from the validation management unit 235a to generate a random number. The random number generator 237 delivers the generated random number to the validation management unit 235a.

The encryption unit 238 encrypts or decodes the message using the secret key co-owned with the application server 100a.

The validation management unit 235a has the function of requesting the random number generator 237 to generate random numbers, and the function of requesting the encryption unit 238 to encrypt a portion of the information transmitted or to decode the encrypted information, in addition to the functions performed by the validation management unit 235 shown in FIG. 13. The validation management unit 235a also has the function of generating the encrypted message, decoding and analyzing the encrypted message and having the random number built into the message.

The validation information storage unit 232a is able to store, in addition to the information that can be stored in the validation information storage unit 232 shown in FIG. 13, the random number generated in the random number generator 237 in association with, e.g., the TID.

Figure 24:
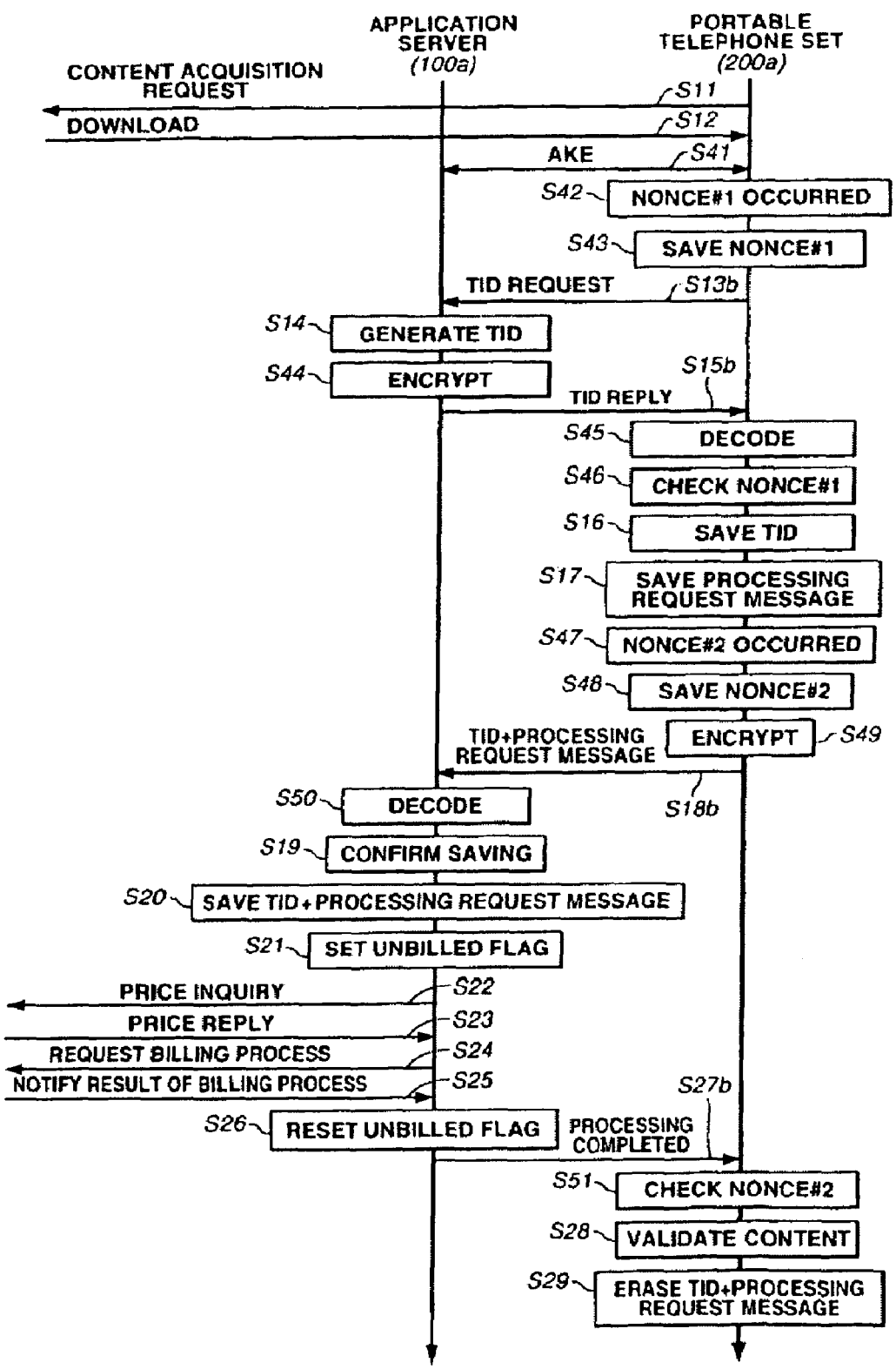
FIG. 24 is a sequence diagram for transactions at the time of validating the content in the third embodiment of the present invention.

FIG. 24 is a sequence diagram of a transaction to validate the content in the third embodiment of the present invention. FIG. 24 shows a case of validating the content using the portable telephone set 200a. In FIG. 24, the same step numbers are used to denote the steps similar to those shown in FIG. 16, and the corresponding explanation is omitted for simplicity. Since the processing in the content server 310 and in the billing server 320 is similar to that in the first embodiment, these servers 310, 320 are disregarded in FIG. 24.

After the content is downloaded by the portable telephone set 200a at steps S11 and S12, the application server 100a and the portable telephone set 200a execute a key exchange process (AKE: Authentication and Key Exchange), using the public key allocated to both, to co-own the secret key. It is also possible to distribute the secret key in advance, without executing the AKE process.

When the portable telephone set 200a starts its operation, the validation management unit 235a requests the random number generator 237 to generate random numbers. The random number generator 237 generates random numbers [NONCE#1] (step S42). The random number generator 237 delivers the generated random numbers [NONCE#1] to the validation management unit 235a. The validation management unit 235a causes the random numbers [NONCE#1] to be saved in the validation information storage unit 232a (step S43). The validation management unit 235a generates a TID request, added by the random numbers [NONCE#1], and sends the so generated TID request to the application server 100a (step S13b).

On receipt of the TID request, the server management unit 113a of the application server 100a causes the TID issuing unit 114 to issue a TID (step S14). The server management unit 113a then requests the encryption unit 116 to encrypt the random numbers [NONCE#1] in association with the TID. The encryption unit 116 is responsive at step S44 to the request to encrypt the random numbers [NONCE#1] in association with the TID, using the secret key acquired at step S41.

The server management unit 113a receives the encrypted random numbers [NONCE#1] and the TID from the encryption unit 116 and transmits the so received random numbers and the TID as a TID reply to the portable telephone set 200a (step S15b). The encryption algorithm may, for example, be a DES (Data Encryption Standard) CBC (Cipher Block Chaining) encryption algorithm.

On receipt of the TID reply, the validation management unit 235a of the portable telephone set 200a delivers the TID reply to the encryption unit 238 to request decoding. The encryption unit 238 at step S45 is responsive to the request from the validation management unit 235a and decodes the TID reply, using the secret key acquired at step S41. Thus, the TID and the random numbers [NONCE#1] are taken out from the TID reply and delivered to the validation management unit 235a.

The validation management unit 235a checks whether the random numbers [NONCE#1] taken out are the same as those saved in the validation information storage unit 232a (step S46). If the random numbers taken out are not the same as those saved, this transaction is terminated as being a failure. If the random numbers taken out are the same as those saved, the TID is saved (step S16) and the processing request message is saved (step S17).

The validation management unit 235a then requests the random number generator 237 to generate random numbers. The random number generator 237 generates new random numbers [NONCE#2] (step S47). The random number generator 237 delivers the generated random numbers [NONCE#2] to the validation management unit 235a.

The validation management unit 235a saves the random numbers [NONCE#2] in the validation information storage unit 232a (step S48). The validation management unit 235a adds the random numbers [NONCE#2] to the TID and to the processing request message and requests encryption by the encryption unit 238. The encryption unit 238 is responsive at step S49 to the request from the validation management unit 235a and collectively encrypts the TID, processing request message and random numbers [NONCE#2], using the secret key acquired at step S41. The encrypted data is delivered to the validation management unit 235a.

The validation management unit 235a transmits the data, encrypted by the encryption unit 238, to the application server 100a, as being the processing request message with the TID added thereto (step S18b).

The server management unit 113a of the application server 100a delivers the processing request message, to which the TID has been added, to the encryption unit 116 to request decoding. The encryption unit 116 decodes the processing request message, to which the TID has been added, using the secret key acquired at step S41, to take out the TID, processing request message and random numbers [NONCE#2] (step S50). The decoded data is delivered to the server management unit 113a.

Subsequently, the saving of the processing request message is confirmed (step S19), the saving of the TID and the processing request message (step S20), setting of the unbilled flag (step S21) and bill processing (steps S22 to S25) are carried out, and the unbilled flag is reset (step S26). The server management unit 113a adds the random numbers [NONCE#2] as random numbers for inspection and transmits a notice of processing completion to the portable telephone set 200a.

The validation management unit 235a of the portable telephone set 200a at step S51 checks whether the random numbers [NONCE#2] contained in the notice of process completion are the same as the random numbers [NONCE#2] saved in the validation information storage unit 232a in the processing at step S48. If the random numbers are different, the transaction is terminated as being a failure. If the random numbers are the same, the contents are validated (step S28), while the TID and the processing request message are erased (step S29).

This effectively prevents the content from being illicitly used.

For example, by encrypting the TID reply and the processing request message, it is possible to prevent interception by those with malignant intention on the network, based on the strength of the encryption used.

The information exchange by malignant users may be coped with by burying the random numbers [NONCE#1] and [NONCE#2]. In the absence of these random numbers, the encrypted messages are the same at all times, provided that the key and the message are the same. In this case, illicit use becomes possible by the following sequence.

First, when a processing request is made, a transaction (from TID acquisition to content validation) is completed once with success. At this time, the TID reply and the process completion message are captured from the network and saved. The portable telephone set then generates a new processing request, which then is discarded without being transmitted to the application server. In place of the TID reply and the notice of process completion which should be returned from the application server, the TID reply and the notice of process completion which have been saved are returned.

This enables the portable telephone set to execute the validation process. In this case, no bill processing is carried out in the application server. Specifically, this means that the content is validated on the portable telephone set without bill processing being performed.

In the third embodiment of the present invention, the random numbers [NONCE#1] and [NONCE#2] are added to the TID request and to the combination of the TID and the processing request message, respectively, whereby the portable telephone set 200a is able to recognize that the reply is that from the application server 100a to its own request. This means that information exchange is not possible.

Thus, with the third embodiment, the transaction of effective use of the server storage area is able to strongly prevent an attack, such as interception.

The above-described processing functions may be implemented by a server computer and a client computer. In this case, a server program, stating the processing contents of the functions to be performed by a server device (content server, billing server, access server and the application server) and a client program stating the processing contents of the functions to be performed by a client device, such as a portable telephone set, are provided. By executing the server program on a server computer, the processing functions of a server device can be realized on the server computer. On the other hand, by executing the client program on a client computer, the processing functions of a client device can be realized on the client computer. The server and client programs, stating the processing contents, may be recorded on a computer-readable recording medium. The computer-readable recording medium may be in the form of a magnetic recording device, an optical disc, a magneto-optical recording medium and a semiconductor memory. The magnetic recording device may, for example, be a hard disc device (HDD), a flexible disc (FD) or a magnetic tape. The optical disc may, for example, be a DVD, a DVD-RAM, a CD-ROM or a CD-R/RW, while the magneto-optical recording medium may, for example, be a MO (Magneto-Optical Disc).

For circulating a server program or a client program, a portable recording medium, such as a DVD or CD-ROM, each having recorded thereon a program(s), has been commercialized. It is also possible to transfer a client program stored in a storage device of a server device from the server device to the client device over a network.

The server computer, executing a server program recorded on, e.g., a portable recording medium, causes the server program to be stored in its own storage device. The server computer directly reads out the server program from its own storage device and executes processing in accordance with the server program. The server computer may also read out the server program directly from the portable recording medium and execute the processing stated in the server program.

The client computer, executing a client program, recorded on, e.g., a portable recording medium, or transferred from a server computer, stores the client program in its own storage device. The client computer reads out the client program from its own storage device and executes processing in accordance with the client program. The client computer is also able to read out the client program directly from the portable recording medium and execute processing in accordance with the so read out client program. Moreover, the client computer is also able to execute processing in accordance with client programs sequentially transferred from the server computer.

According to the present invention, if a communication error is detected by a client device, a processing request having the same identification information as that of a previous processing request is re-transmitted to a server device, and, if a processing request having the same identification information as that of a completed first process is re-received by the server device, a completion notice for the first process is transmitted from the server device to the client device, without executing the first process. Thus, even if the completion notice has not been received due, for example, to network malfunctioning, the client device is able to receive the completion notice and execute the second process, without executing the first process twice, subject to re-transmission of the processing request. As a consequence, it is guaranteed that the first process is carried out once and the second process is similarly carried out once.

The invention claimed is:

1. A server device for performing concerted processing with another device connected thereto over a network, comprising:

first processing executing means which, on receipt of a processing request for first processing, afforded with the identification information, executes said first processing only once for one item of said identification information, completion notice transmitting means which, on completion of said first processing by said first processing executing means, or on re-receipt of said processing request for said first processing, afforded with the same identification information as that of the completed first processing, transmits a completion notice of said first processing to the source of transmission of said processing request, storage means for storing said processing request for said first processing, having said identification information conferred thereto, on completion of said first processing, said first processing executing means and said completion notice transmission means verifying whether or not said first processing for said identification information was completed in the past, depending on whether or not the received processing request has been stored in said storage means, and erasing means for erasing said processing request for said first processing, having said identification information conferred thereto, from said storage means, on receipt of a response for completion of second processing, correlated in advance with said first processing, after transmission of the completion notice of said first processing.

2. The server device as recited in claim 1 further comprising identification information transmitting means for generating the unique identification information on receipt of a request for the identification information and for transmitting the so generated identification information to the source of transmission of the request for the identification information.

3. The server device as recited in claim 2 wherein said identification information transmitting means collectively encrypts the identification information and random numbers delivered from the source of transmission of said identification information request and transmits the encrypted identification information to said source of transmission.

4. The server device as recited in claim 1 further comprising decoding means which, on receipt of the encrypted processing request comprised of the processing request for the first processing, afforded with said identification information, and random numbers, encrypted together, decodes said encrypted processing request to take out said random numbers and the processing request;
said completion notice transmitting means transmitting said completion notice, having said random numbers conferred thereto as random numbers for inspection, to the source of transmission of said processing request.

5. A method for providing concerted processing in a server device, adapted for performing concerted processing with another device connected to the server device over a network, comprising the steps of:
executing first processing, on receipt of a processing request for said first processing, afforded with the identification information, only once for one item of said identification information, and
transmitting a completion notice of said first processing to the source of transmission of said processing request, on completion of said first processing, or on re-receipt of said processing request for said first processing, afforded with the same identification information as that of the completed first processing,
storing said processing request for said first processing, having said identification information conferred thereto, on completion of said first processing,
verifying whether or not said first processing for said identification information was completed in the past, depending on whether or not the received processing request has been stored in the storing step, and
erasing said processing request for said first processing, having said identification information conferred thereto, of the storing step, on receipt of a response for completion of second processing, correlated in advance with said first processing, after transmission of the completion notice of said first processing.

6. A server device for performing concerted processing with another device connected thereto over a network, comprising:
first processing executing means which, on receipt of a processing request for first processing, afforded with the identification information, executes said first processing only once for one item of said identification information,
completion notice transmitting means which, on completion of said first processing by said first processing executing means, or on re-receipt of said processing request for said first processing, afforded with the same identification information as that of the completed first processing, transmits a completion notice of said first processing to the source of transmission of said processing request, and
identification information transmitting means for generating the unique identification information on receipt of a request for the identification information and for transmitting the so generated identification information to the source of transmission of the request for the identification information,
wherein said identification information transmitting means collectively encrypts the identification information and random numbers delivered from the source of transmission of said identification information request and transmits the encrypted identification information to said source of transmission.

7. The server device as recited in claim 6 further comprising:
storage means for storing said processing request for said first processing, having said identification information conferred thereto, on completion of said first processing;
said first processing executing means and said completion notice transmission means verifying whether or not said first processing for said identification information was completed in the past, depending on whether or not the received processing request has been stored in said storage means.

8. The server device as recited in claim 7 further comprising erasing means for erasing said processing request for said first processing, having said identification information conferred thereto, from said storage means, on receipt of a response for completion of second processing, correlated in advance with said first processing, after transmission of the completion notice of said first processing.

9. The server device as recited in claim 6 further comprising decoding means which, on receipt of the encrypted processing request comprised of the processing request for the first processing, afforded with said identification information, and random numbers, encrypted together, decodes said encrypted processing request to take out said random numbers and the processing request;
said completion notice transmitting means transmitting said completion notice, having said random numbers conferred thereto as random numbers for inspection, to the source of transmission of said processing request.

10. A method for providing concerted processing in a server device, adapted for performing concerted processing with another device connected to the server device over a network, comprising the steps of:
executing first processing, on receipt of a processing request for said first processing, afforded with the identification information, only once for one item of said identification information, and
transmitting a completion notice of said first processing to a source of transmission of said processing request, on completion of said first processing, or on re-receipt of said processing request for said first processing, afforded with the same identification information as that of the completed first processing, and
generating the unique identification information on receipt of a request for the identification information,
transmitting the so generated identification information to the source of transmission of the request for the identification information,
wherein the identification information and random numbers delivered from the source of transmission of said identification information request are collectively encrypted for transmitting the encrypted identification information to said source of transmission.

* * * * *